United States Patent
Ohashi et al.

[19]

[11] Patent Number: 5,862,664

[45] Date of Patent: Jan. 26, 1999

[54] CHARGING PUMP FOR A HYDROSTATIC TRANSMISSION

[75] Inventors: Ryota Ohashi; Kenichi Takada, both of Amagasaki, Japan

[73] Assignee: Kanzaki Kokyukoki Mfg. Co., Ltd., Japan

[21] Appl. No.: 749,501

[22] Filed: Nov. 15, 1996

[30] Foreign Application Priority Data

Nov. 16, 1995 [JP] Japan .................................. 7-298701
Jan. 9, 1996 [JP] Japan .................................. 8-001392

[51] Int. Cl.⁶ .................................................. F16D 31/02
[52] U.S. Cl. .............................. 60/454; 60/488; 418/131; 418/135
[58] Field of Search .............................. 60/454, 464, 486, 60/488; 418/135, 131, 166, 171

[56] References Cited

U.S. PATENT DOCUMENTS 3,171,359 3/1965 Spencer et al. ........................ 418/131
3,360,933 1/1968 Swanson et al. ........................ 60/488
5,311,740 5/1994 Shiba et al. .............................. 60/488
5,456,068 10/1995 Ishii et al. ............................... 60/487

FOREIGN PATENT DOCUMENTS 6-12276 3/1994 Japan .

*Primary Examiner*—F. Daniel Lopez
*Attorney, Agent, or Firm*—Sterne, Kessler, Goldstein & Fox, P.L.L.C.

[57] ABSTRACT

A hydrostatic transmission and a charge pump for supplying operating oil which are housed in a housing, in which a pump casing of the charge pump is mounted to a center section of the hydrostatic transmission without using mounting bolts. A spring is interposed between the pump casing and the inner surface of the housing. For defining pump discharge pressure, the center section receives all of the radial force generated in the pump casing. Between the center section and the charge pump is interposed a plate of material made of less friction resistance so as to reduce the sliding resistance. The charge pump is simple in construction and inexpensive to produce.

24 Claims, 24 Drawing Sheets

CHARGING PUMP FOR A HYDROSTATIC TRANSMISSION

BACKGROUND OF THE INVENTION

1. Field of the Invention

The present invention relates to a charge pump attached to a center section in a hydrostatic transmission (hereinafter referred to as an "HST"), and more particularly to a charge pump whose support mechanism is simple in construction and inexpensive to produce.

2. Related Art

It is well-known that a charge pump for supplying operating oil to an HST may be mounted in close contact with one surface of a center section of the HST. The charge pump may be housed in a housing and driven by an input shaft of the HST which perforates through the center section. Such an arrangement disclosed in Japanese Utility Model Publication No. Hei 6-12276 which was filed by the same applicant as the present application. In such an arrangement, the pump casing which contains the charge pump is flexibly supported by a disc spring (rather than by bolts) disposed between the lower surface of the center section and the inner bottom surface of the housing. The charge pump is biased toward the horizontal lower surface of the center section so as to come into close contact therewith. This provides a charge pump with a self-charging relief function.

In such the conventional construction, a pin extends from the upper surface of the pump casing and is retained in the horizontal lower surface of the center section. As a result, the pump casing is not rotatable around the input shaft and the discharge port of the charge pump is maintained in proper communication with an operating oil supply port of the center section. Furthermore, the charge pump can move axially of the input shaft during the relief operation. When the charge pump is driven by the input shaft, a radial force or bending stress, generated at the pump casing is placed on the pin which acts as a shearing force on the pin, causing concern that the pin may be severed. Hence, a tough and highly rigid material should be used for manufacture of the pin. Therefore, the number of parts required in this arrangement is greater, leaving room for improvement in this known design.

The above-described spring for creating charge relief pressure uses a disc-like spring of corrugated annular plate-type. Such a spring is relatively larger in spring constant, creating a problem when variations exist during assembly in that the relief setting pressure may differ from one device to the next.

Further, the horizontal lower surface of the center section, with which the charge pump comes into close contact, needs to be machined with high accuracy in order to reduce the rotational and sliding resistance of the charge pump. This raises the processing cost. Moreover, discharge oil from the charge pump, when the accuracy of the machining processing is poor, leaks from the sliding surface of the charge pump resulting in a reduction in the efficiency of the device.

SUMMARY OF THE INVENTION

One object of the present invention is to provide a charge pump for supplying operating oil to the HST, which is housed together with the HST in a housing and is driven by an input shaft mounted on one surface of a center section of HST. A spring is interposed between a pump casing, in which the charge pump is disposed, and the inner surface of the housing. The pump casing is biased by the spring so as to be brought into close contact with one surface of the center section and is disposed thereon in a "floating" manner. The biasing force of the spring defines the pump discharge pressure of the charge pump. A coil-type spring is used to obtain less variation in the pressure of the relief setting of the charge relief function. As a result, the radial force of the pump casing is reliably received by a portion of the HST which is of high rigidity and the number of parts is reduced.

Further, a plate made from a material of less frictional resistance is interposed between the center section and the charge pump so as to reduce the sliding contact resistance when the charge pump is rotated. As a result, a charge pump of lower manufacturing cost can be obtained without raising the processing accuracy for the mounting surface of the charge pump on the center section.

BRIEF DESCRIPTION OF THE FIGURES

Other objects and aspects of the present invention will become apparent from the following description of the embodiments with reference to the accompanying drawings in which:

FIG. 9(*b*) is an enlarged view showing an alternative check means for the pump casing in relation to the center section of the HST;

DETAILED DESCRIPTION OF THE PREFERRED EMBODIMENTS

Figure 1:
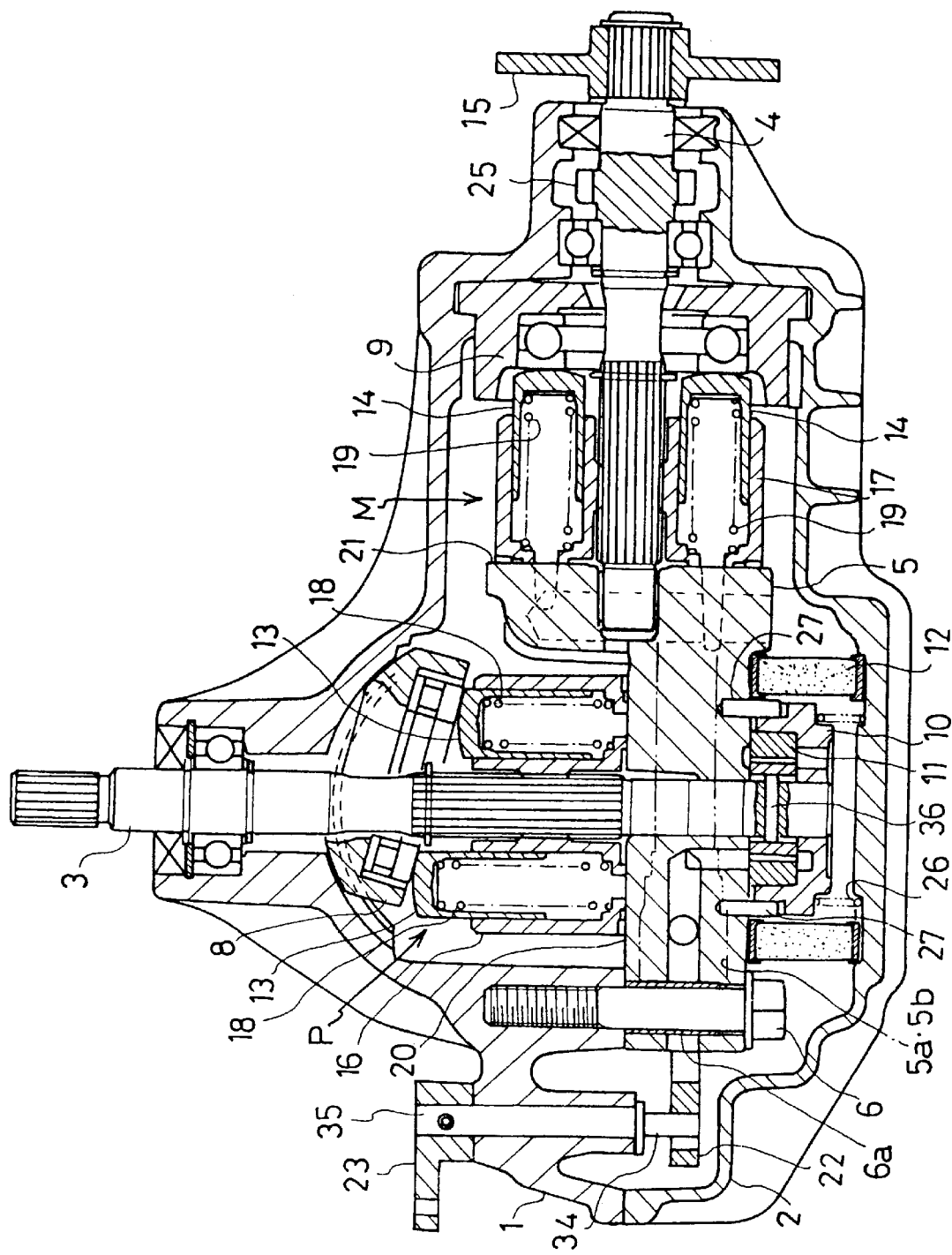
FIG. 1 is a cross-sectional view of the HST of the present invention.

The HST shown in FIG. 1 includes a housing which comprises an upper half housing 1 and a lower half housing 2 which are joined to each other along a horizontal surface. The housing contains the HST and forms an oil sump which is filled with operating oil for the HST. A center section 5, which is L-like-shaped when viewed in cross-section is disposed within the housing. Center section 5 is provided with a horizontal portion and a vertical portion and is fixed to the upper half housing 1 by mounting bolts 6. A pump mounting surface 20 is formed on the upper surface of the horizontal portion of center section 5. A cylinder block 16, constituting a hydraulic pump P of the axial piston-type is rotatably disposed on pump mounting surface 20. Pistons 13 are biased by springs 18 into a plurality of cylinder bores formed in cylinder block 16. Pistons 13 are freely moveable into and out of the cylinder bores. The heads of pistons 13 abut against a thrust bearing held to a movable swash plate 8.

An input shaft 3 engages with cylinder block 16 at the axis of rotation thereof. The rotational axis of input shaft 3 extends vertically. Input shaft 3 is supported at the upper end thereof by the upper half housing 1 and at the lower end by pump mounting surface 20 of center section 5. The upper end of input shaft 3 projects upwardly and outwardly from the upper surface of upper half housing 1. At the upper end of input shaft 3 is fixed a pulley (not shown), by which power is inputted to input shaft 3 from an engine or the like through a belt (also not shown).

A motor mounting surface 21 is formed on the outside surface of the vertical portion of center section 5. A cylinder block 17, constituting an axial piston-type hydraulic motor M, is rotatably disposed on motor mounting surface 21. Pistons 14 are inserted into a plurality of cylinder bores formed in cylinder block 17 and are biased by springs 19 such that they are movable into and out of the cylinder bores. The heads of pistons 14 abut against a thrust bearing held to a fixed swash plate 9, which is fixedly sandwiched between upper half housing 1 and lower half housing 2.

An output shaft 4 engages with cylinder block 17 at the axis of rotation thereof and is horizontally disposed. A bearing for supporting one end of output shaft 4 is provided at the joint surface of upper half housing 1 and lower half housing 2. Output shaft 4 is supported at the other end to motor mounting surface 21 of center section 5.

A pair of left and right axles (not shown) are provided in the housing. A gear 25 is provided on output shaft 4 and is interlocked through a power transmission mechanism, such as gears, with the axles. Output shaft 4 projects at the utmost end thereof outwardly from the housing. A brake disc 15 for braking the axles is provided at the utmost end of output shaft 4.

Figure 15:
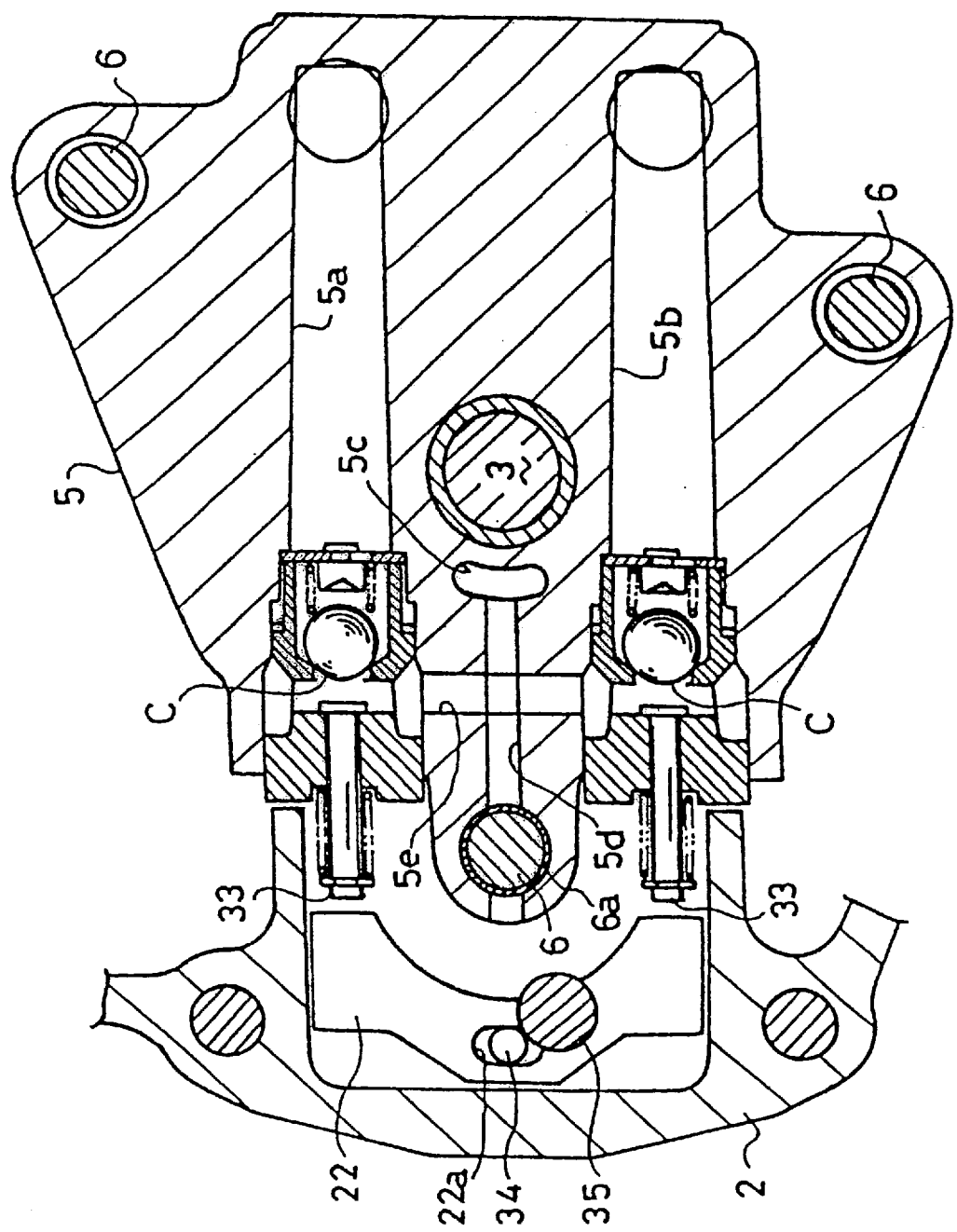
FIG. 15 is a cross-sectional plan view of the center section.

As shown in FIG. 15, a pair of oil passages 5a and 5b are provided in parallel to each other in center section 5 and communicate with a pair of kidney ports open at pump mounting surface 20 and a pair of kidney ports open at motor mounting surface 21 to form a closed fluid circuit for circulating operating oil between cylinder block 16 of hydraulic pump P and cylinder block 17 of hydraulic motor M. Check valves C for supplying operating oil are disposed at the open ends of oil passages 5a and 5b.

An operating oil supply port 5c is open at the horizontal lower surface of center section 5 and communicates with the discharge side of a charge pump 11, to be discussed below. Operating oil supply port 5c also communicates with an oil passage 5d in center section 5. Oil passage 5d extends from oil supply port 5c and communicates with an oil passage 5e extending between check valves C. Oil passage 5d has an open end closed by a sleeve 6a which has an insertion bore for mounting bolt 6. Sleeve 6a functions at the outer periphery as a plug for closing the open end of oil passage 5d.

As seen in FIG. 1, movable swash plate 8 is interlocked with a speed changing member, such as a lever or a pedal provided on the vehicle to which the HST is mounted. As shown in FIG. 1, movable swash plate 8 may be tilted from a horizontal neutral position to vary the amount and direction of oil discharged from hydraulic pump P to hydraulic motor M through the closed fluid circuit in center section 5. This results in an HST creating a stepless output rotation of motor shaft 4 of hydraulic motor M.

Check valves C, as shown in FIG. 15, are provided with push pins 33 for allowing the input and output sides of check valves C to open into the oil sump. The utmost ends of push pins 33 are biased by springs to center section 5. Push pins 33 project outwardly in parallel to each other and are opposite to a single biasing member 22. The center of biasing member 22 has an elongated bore 22a. A cam pin 34 is inserted into elongated bore 22a and is fixed to the lower end of an operating shaft 35 (shown in FIG. 1). The upper end of operating shaft 35 projects outwardly from the housing so as to fixedly support a by-pass arm 23. When by-pass arm 23 is rotated for hauling the vehicle, cam pin 34 moves biasing member 22 forwardly, and push pins 33 are retreated so as to open the check valves C, thereby opening the closed fluid circuit into the housing to obtain free rotation of hydraulic motor M.

At the horizontal lower surface of center section 5, opposite to pump mounting surface 20, is disposed a pump casing 10 which contains charge pump 11. Pump casing 10 is molded from sintered metal material. A recess is formed on the upper surface in which trochoid-type charge pump 11 is disposed. Charge pump 11 supplies oil into the closed fluid circuit of the HST.

Figure 2:
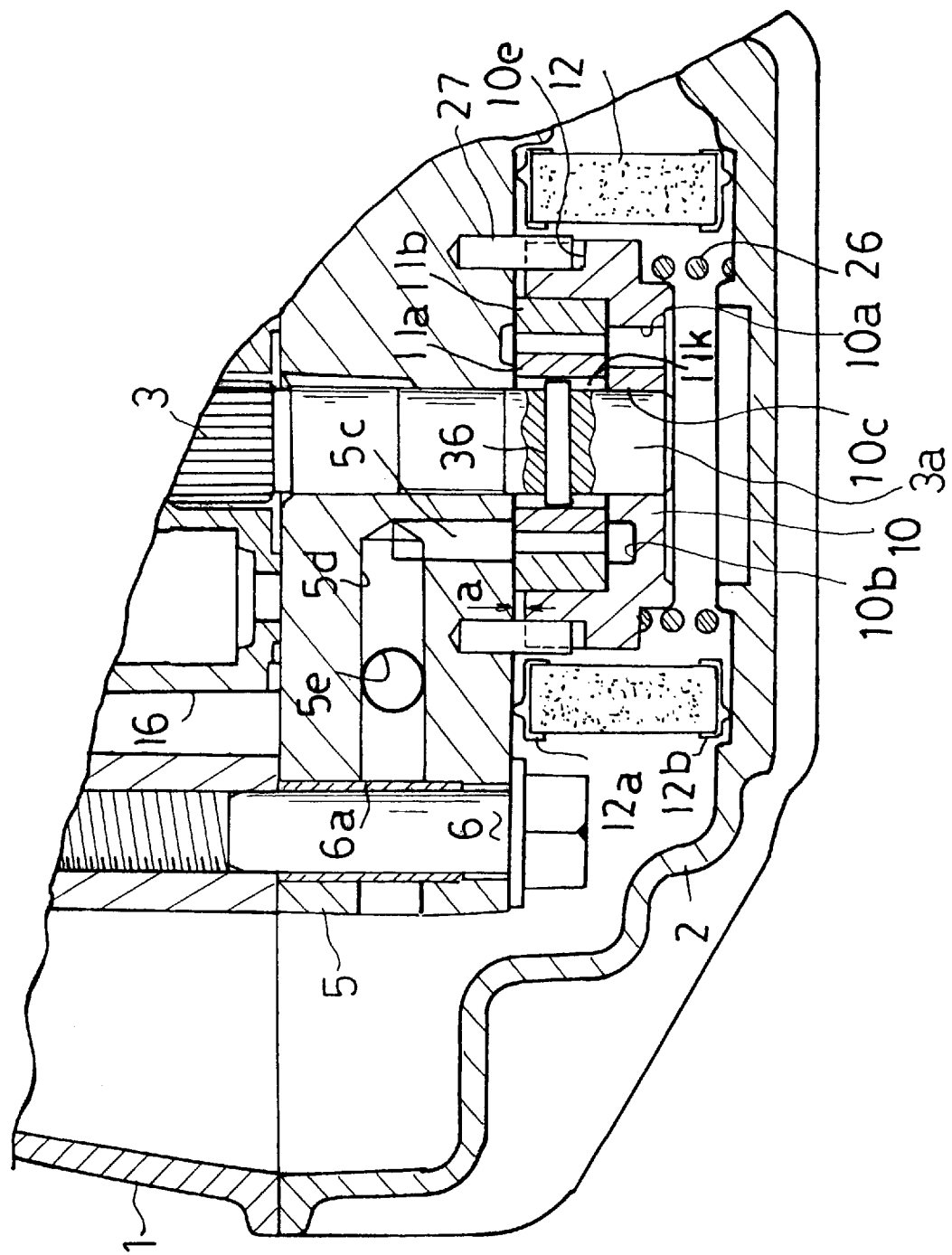
FIG. 2 is an enlarged partial view of the principal portions of the charge pump shown in FIG. 1.

Although a trochoid-type charge pump is shown in the Figures, the invention is not limited to this. A gear-type charge pump or a vane-type charge pump may also be used, for example. Charge pump 11 comprises an inner rotor 11a and an outer rotor 11b. Outer rotor 11b is rotatably guided at the outer periphery thereof by the inner periphery of pump casing 10. Inner rotor 11a is engageable with internal teeth of outer rotor 11b and is disposed in outer rotor 11b. The depth of the recess in pump casing 10, as shown in FIG. 2, is smaller than the thicknesses of inner rotor 11a and outer rotor 11b, so that one end surface of inner rotor 11a and outer rotor 11b is brought into slidable contact with the horizontal lower surface of center section 5.

Inner rotor 11a is provided with grooves 11k for axially slidably and not-relative-rotatably engaging with a pin 36 mounted to the lower end of input shaft 3 which projects from the horizontal lower surface of center section 5. The axis of rotation of charge pump 11 extends vertically. Input shaft 3 drives the hydraulic pump P and charge pump 11.

A suction port is formed at one side of the engaging portion of inner rotor 11a and outer rotor 11b. A discharge port is formed at the other side thereof. The discharge port is opposite to operating oil supply port 5c and communicates therewith.

A coil spring 26 is interposed between the lower surface of pump casing 10 and the inner bottom surface of lower half housing 2 so that pump casing 10 is biased by spring 26 to bring one end surface of inner rotor 11a and outer rotor 11b into close contact with the horizontal lower surface of center section 5. Thus, pump casing 10 is mounted in a floating manner whereby the biasing force of coil spring 26 defines the discharge pressure of charge pump 11. When pressure in the discharge port of charge pump 11 becomes greater than a predetermined biasing force, pump casing 10 together with inner rotor 11a and outer rotor 11b move axially down input shaft 3 so as to create a gap between one end surface of inner rotor 11a and outer rotor 11b and the horizontal lower surface of center section 5, whereby the discharge port of charge pump 11 is open to the oil sump in the housing to discharge oil having a pressure greater than the predetermined value. Thus, pump casing 10 and coil spring 26 function as a charge relief valve. Since coil spring 26 has a smaller spring constant than a conventional corrugated spring, variations in the individual relief pressure setting can be minimized even when the mounting length of the spring is not exact due to an error in the assembly thereof.

An annular oil filter 12, having an inner diameter which is larger than an outer diameter of pump casing 10, is disposed between the horizontal lower surface of center section 5 and the inner bottom surface of lower half housing 2 and surrounding the peripheral surface of pump casing 10. Oil filter 12 is molded of porous material. Both annular ends of oil filter 12 are covered by sealing members 12a and 12b, respectively. One sealing member 12a is brought into close contact with the horizontal lower surface of center section 5 and the other sealing member 12b is brought into close contact with the inner bottom surface of lower half housing 2 so as to separate the exterior and the interior of oil filter 12. A suction port 10a which communicates with the suction port of charge pump 11 is open at the lower surface of pump casing 10 so as to communicate with the interior of oil filter 12.

In summary, the present invention is designed so that charge pump 11 is mounted to the horizontal lower surface of center section 5 in a floating manner, rather than being fixed by bolts for example, as is conventional.

Figure 3:
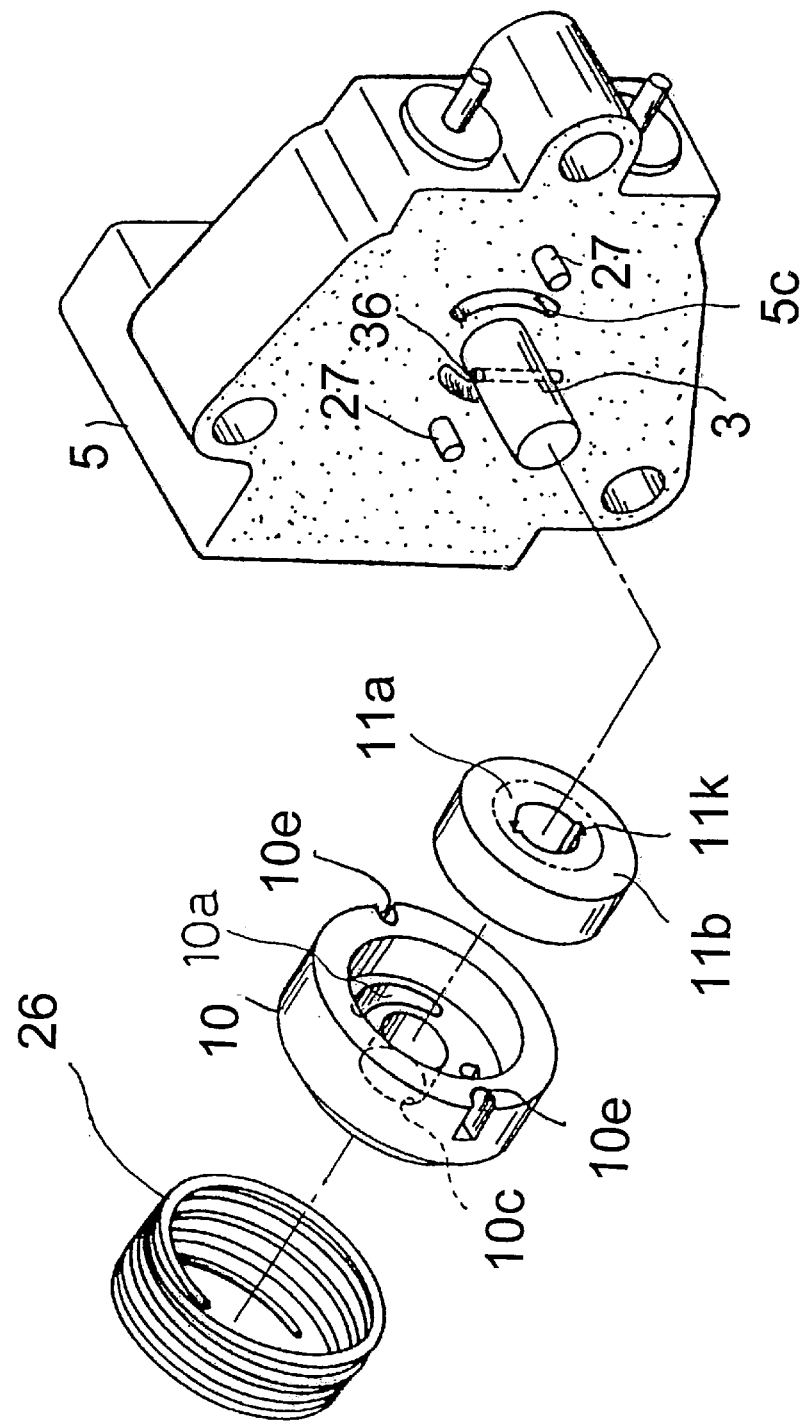
FIG. 3 is an exploded view of the charge pump in relation to the center section of the HST.

Next explanation will be given on a first embodiment of the present invention in accordance with FIGS. 2 and 3.

In this embodiment, two guide pins 27 project from the horizontal lower surface of center section 5 and are fitted into recesses 10e formed on the outer periphery of pump casing 10 which act as detent means for receiving guide pins 27, whereby the mounting position of pump casing 10 with respect to center section 5 is restrained from rotatably shifting around the axis of rotation of input shaft 3, while still allowing pump casing 10 to move axially, away from and towards, center section 5. Hence, the discharge port of charge pump 11 is always properly maintained in communication with operating oil supply port 5c.

In order to receive the radial force generated in pump casing 10 when charge pump 11 is driven, a pivotal support bore 10c having an inner diameter which is about equal to the outer diameter of input shaft 3 is disposed coaxially therewith at the bottom surface of the recess in pump casing 10. The lower end 3a of input shaft 3 extends into pivotal support bore 10c and is relatively, rotatably and axially fitted therein, yet it allows pump casing 10 to move axially. The radial force is received by center section 5 through input shaft 3. As a result, guide pins 27, for preventing pump casing 10 from rotating together with charge pump 11, are not subjected to the radial force of pump casing 10, thereby enabling pins 27 to be made of relatively low rigidity material, which lowers the manufacturing cost of the pins.

Figure 4:
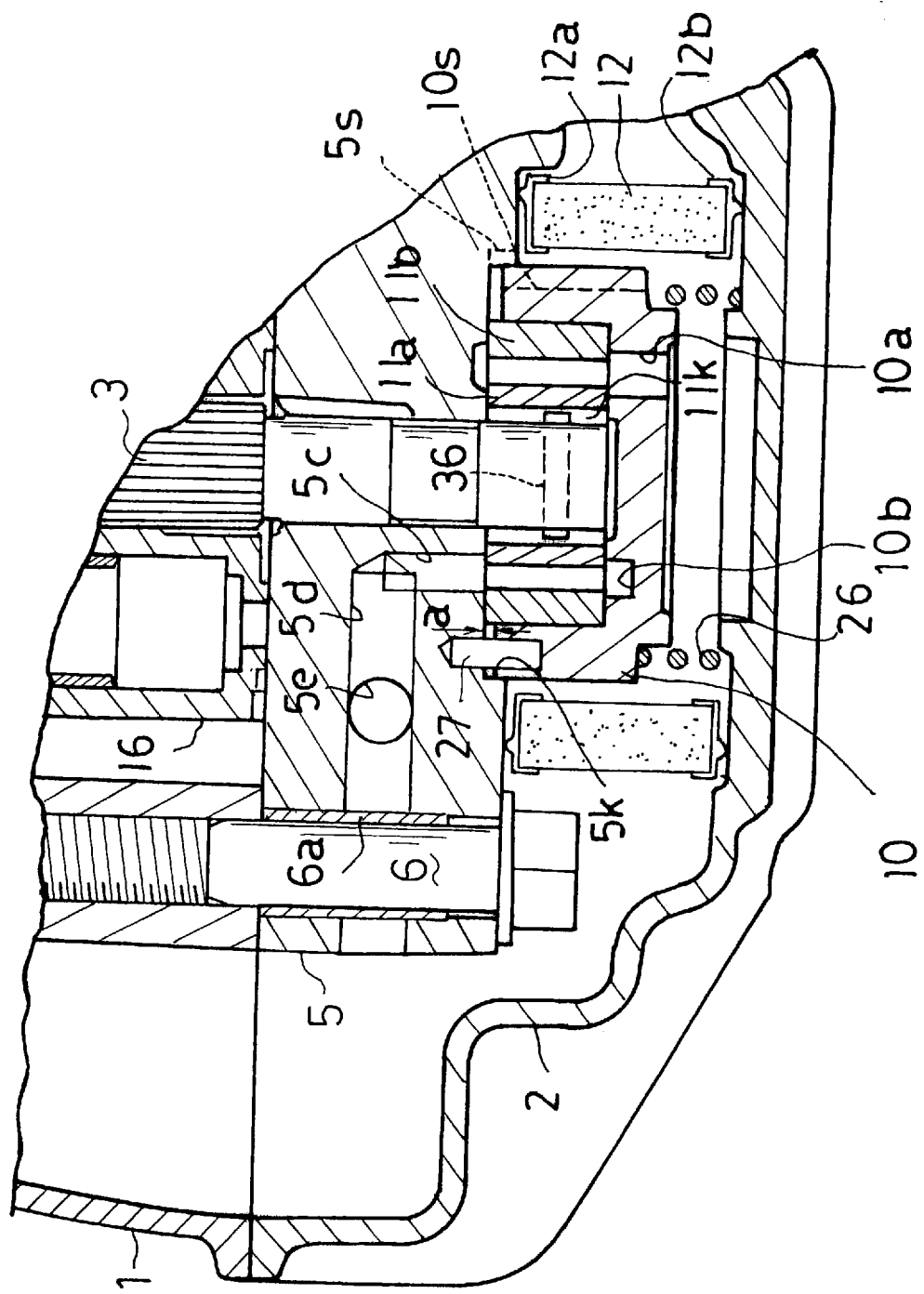
FIG. 4 is an enlarged partial view of the principal portions of the charge pump according to a second embodiment of the present invention.
Figure 5:
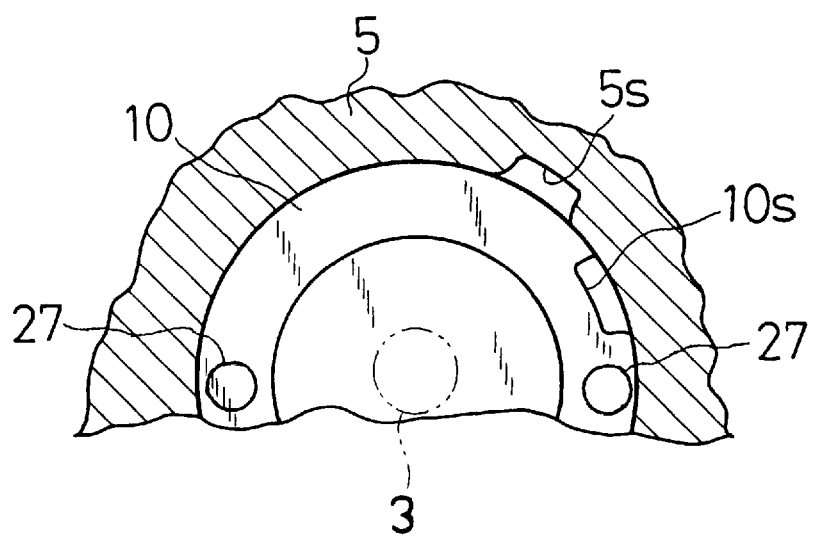
FIG. 5 is a partial sectional view of the center section of the same.

Next, explanation will be given on a second embodiment of the invention shown in FIGS. 4 and 5. In this embodiment, in order for center section 5 to directly receive the radial force generated in pump casing 10, a recess 5k is provided at the horizontal lower surface of center section 5. Recess 5k is substantially similar in external shape to pump casing 10. The upper portion of pump casing 10 is axially slidably fitted into recess 5k of pump casing 10. The utmost ends of guide pins 27, disposed on the upper surface of pump casing 10, are axially slidably retained in a boss provided on the horizontal lower surface of center section 5. Pump casing 10 returns the relief oil discharged through the discharge port to the oil sump through recess 5k. In particular, as best seen in FIG. 5, oil grooves 5s and 10s are provided on the inner periphery of recess 5k of center section 5 and on the outer periphery of pump casing 10, respectively.

Figure 6:
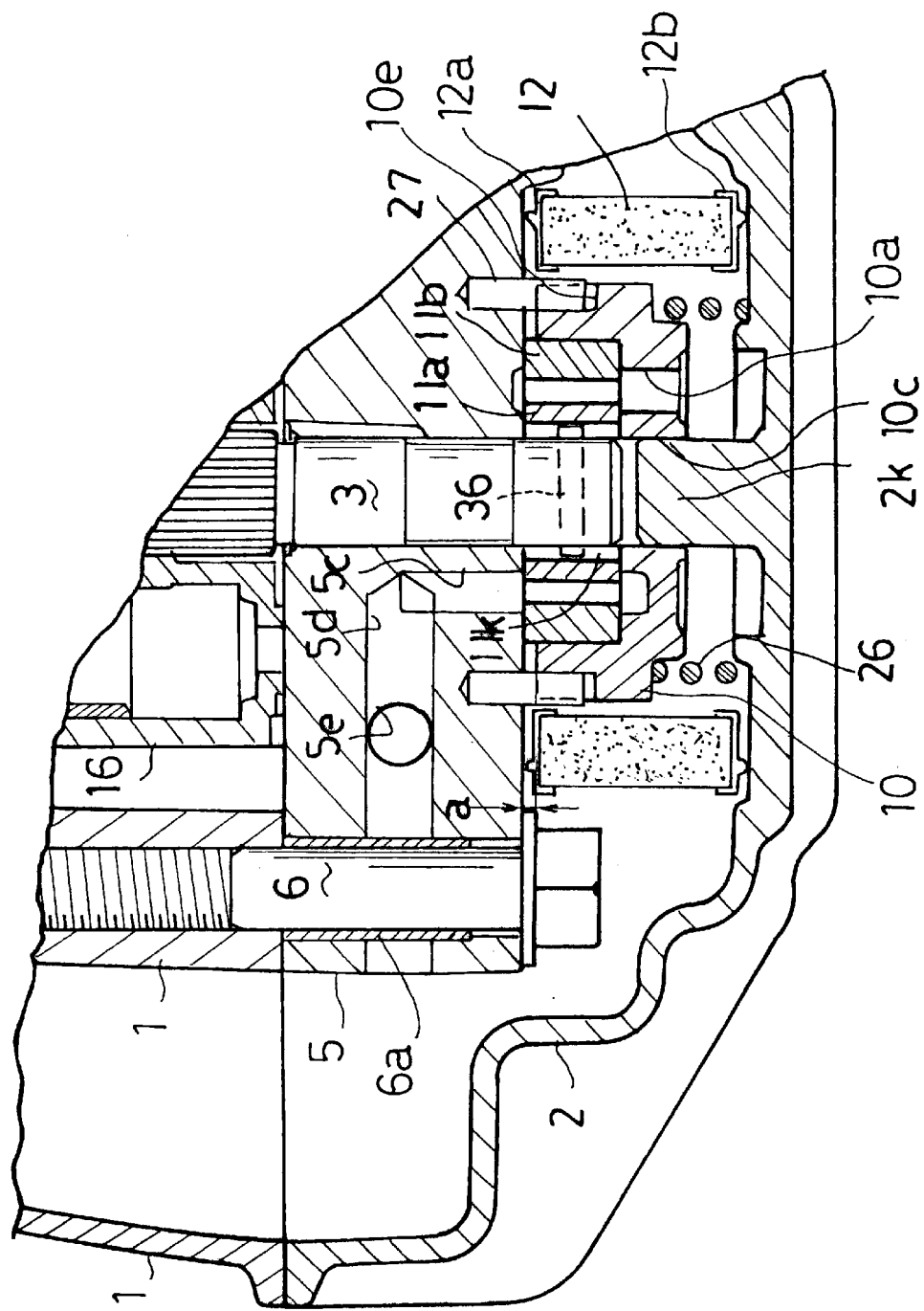
FIG. 6 is an enlarged partial view of the principal portions of the charge pump according to a third embodiment of the present invention.

In a third embodiment shown in FIG. 6, a projection 2k is integrally formed in a coaxial position with input shaft 3 at the inner bottom surface of lower half housing 2 and is axially slidably fitted into a pivotal support bore 10c formed on the lower surface of pump casing 10. The radial force generated on pump casing 10 is received by the housing while allowing pump casing 10 to slide axially. Pump casing 10 is detained by guide pins 27 in the same manner as described above with respect to the first embodiment.

Figure 7:
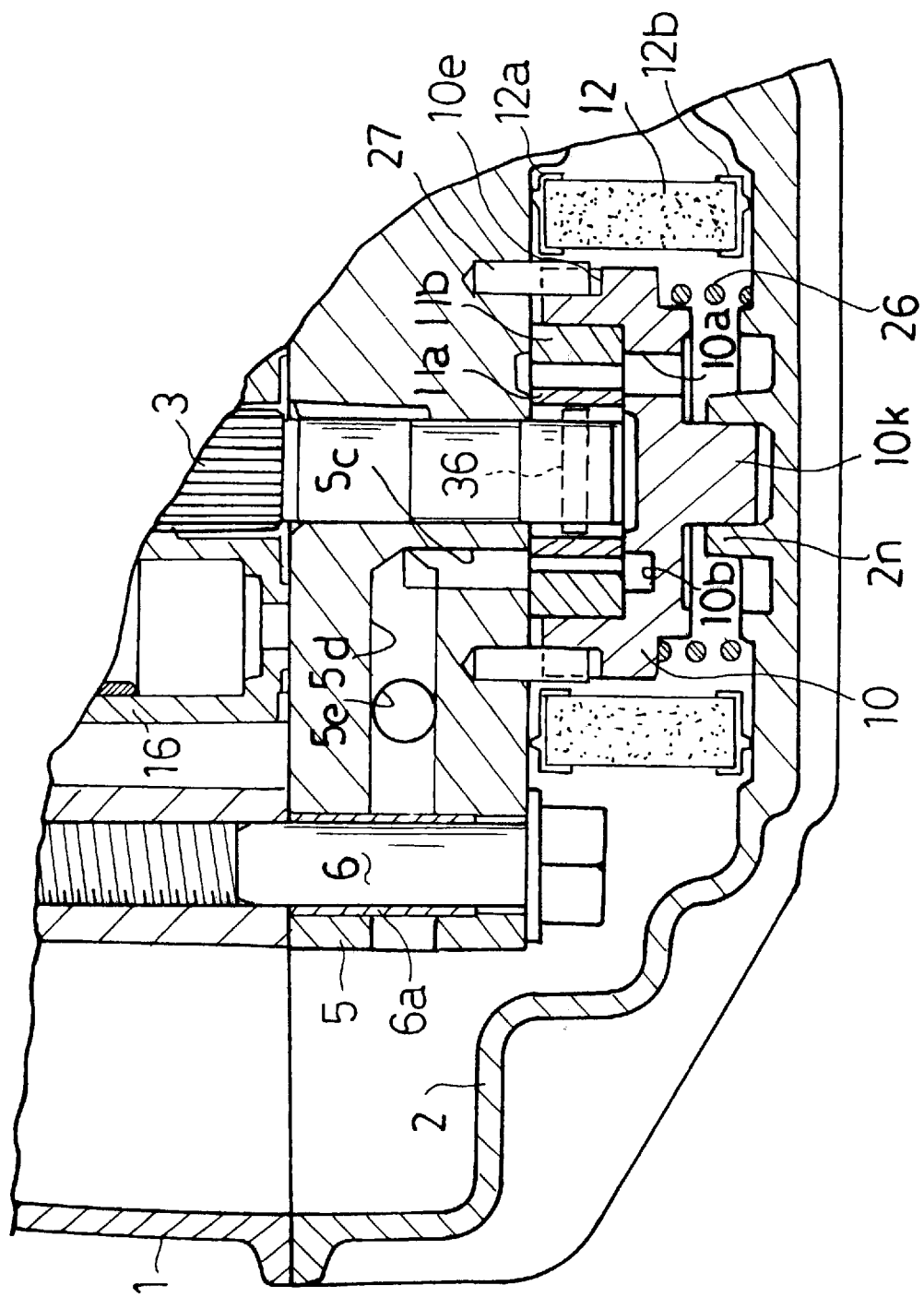
FIG. 7 is an enlarged partial view of the principal portions of the charge pump according to a fourth embodiment of the present invention.

As shown in a fourth embodiment in FIG. 7, a projection 10k is provided in a coaxial position with respect to input shaft 3 at the lower surface of pump casing 10. Projection 10k is axially slidably fitted into a recess 2n provided on the inner bottom surface of lower half housing 2. As in the other embodiments, pump casing 10 is slidable axially and the radial force of the charge pump is received by the housing. The remainder of this embodiment is similar to the embodiment shown in FIG. 6.

Figure 8:
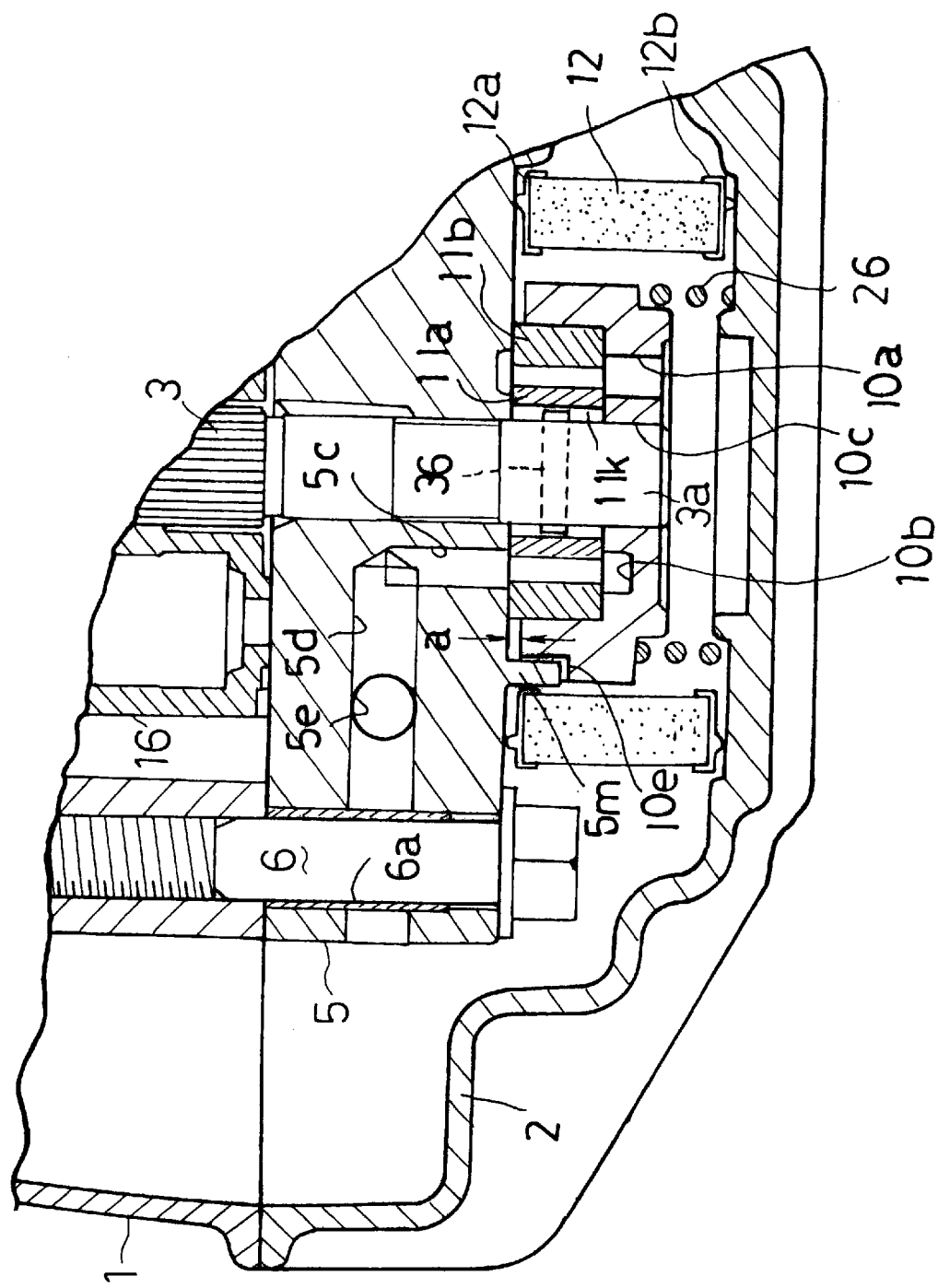
FIG. 8 is an enlarged partial view of the principal portions of the charge pump according to a fifth embodiment of the present invention.
Figure 9A:
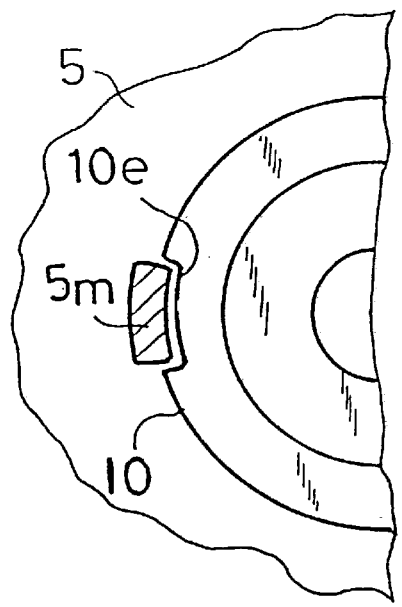
FIG. 9(*a*) is an enlarged view showing the check means for the pump casing in relation to the center section of the HST.
Figure 9B:
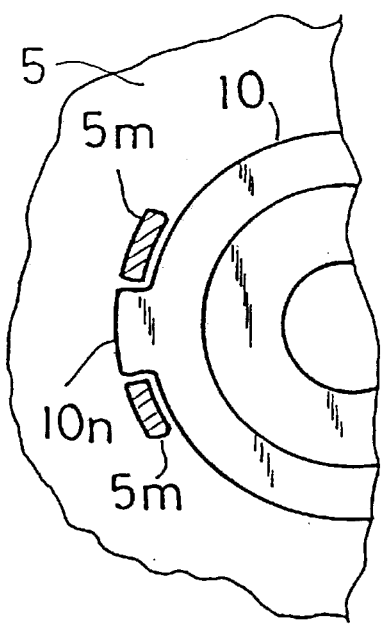

A fifth embodiment of the present invention is shown in FIGS. 8 and 9(*a*). This embodiment is the same as the first embodiment, in that the radial force of pump casing 10 is received by center section 5 through input shaft 3. This embodiment is different from the above embodiment in that the pump casing is detained, not by guide pins as in the first embodiment, but by a projection 5*m* which is integrally provided along the horizontal lower surface of center section 5. Projection 5*m* is axially slidably retained into a recess 10*e* provided in the outer periphery of pump casing 10.

In the modified embodiment shown in FIG. 9(*b*), a pair of projections are integrally provided along the horizontal lower surface of center section 5 and a projection 10*n* is integrally provided on the outer periphery of pump casing 10. Pump casing 10 is detained by the retention of projection 10*n* between both projections 5*m*.

Figure 11:
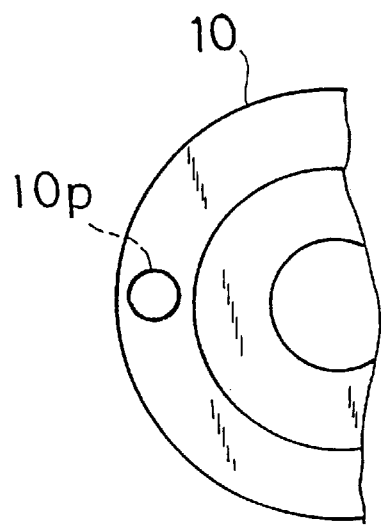
FIG. 11 is an enlarged view showing an alternative check means for the pump casing in relation to the center section of the HST.
Figure 10:
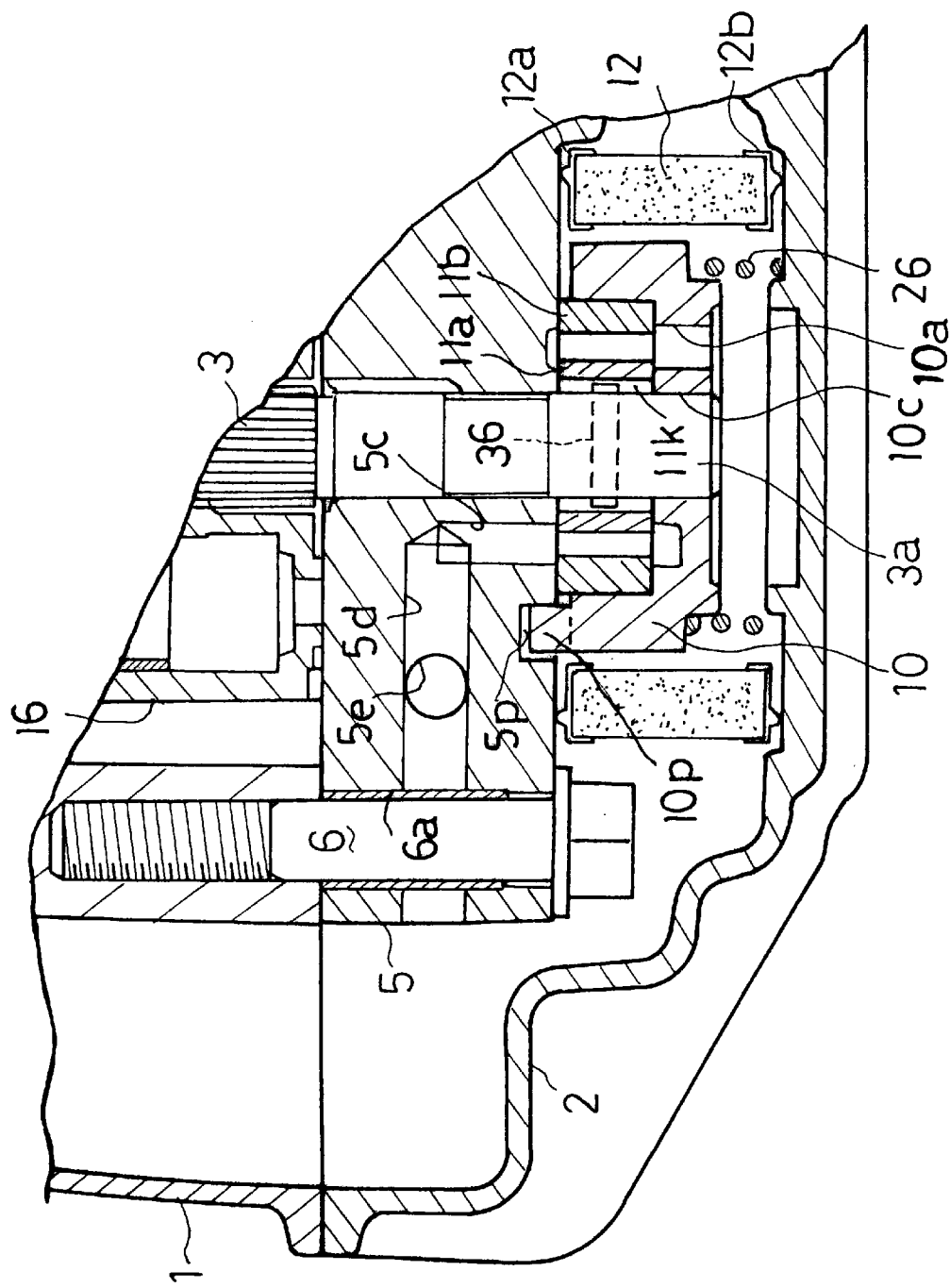
FIG. 10 is an enlarged sectional view of the principal portions of the charge pump in accordance with a sixth embodiment of the present invention.

In a sixth embodiment of the present invention shown in FIGS. 10 and 11, a cylindrical projection 10*p* is integrally provided on the upper surface of pump casing 10. Cylindrical projection 10*p* is axially slidably fitted into an engaging bore 5*p* provided along the horizontal lower surface of center section 5, which detains the rotation of pump casing 10.

Figure 12:
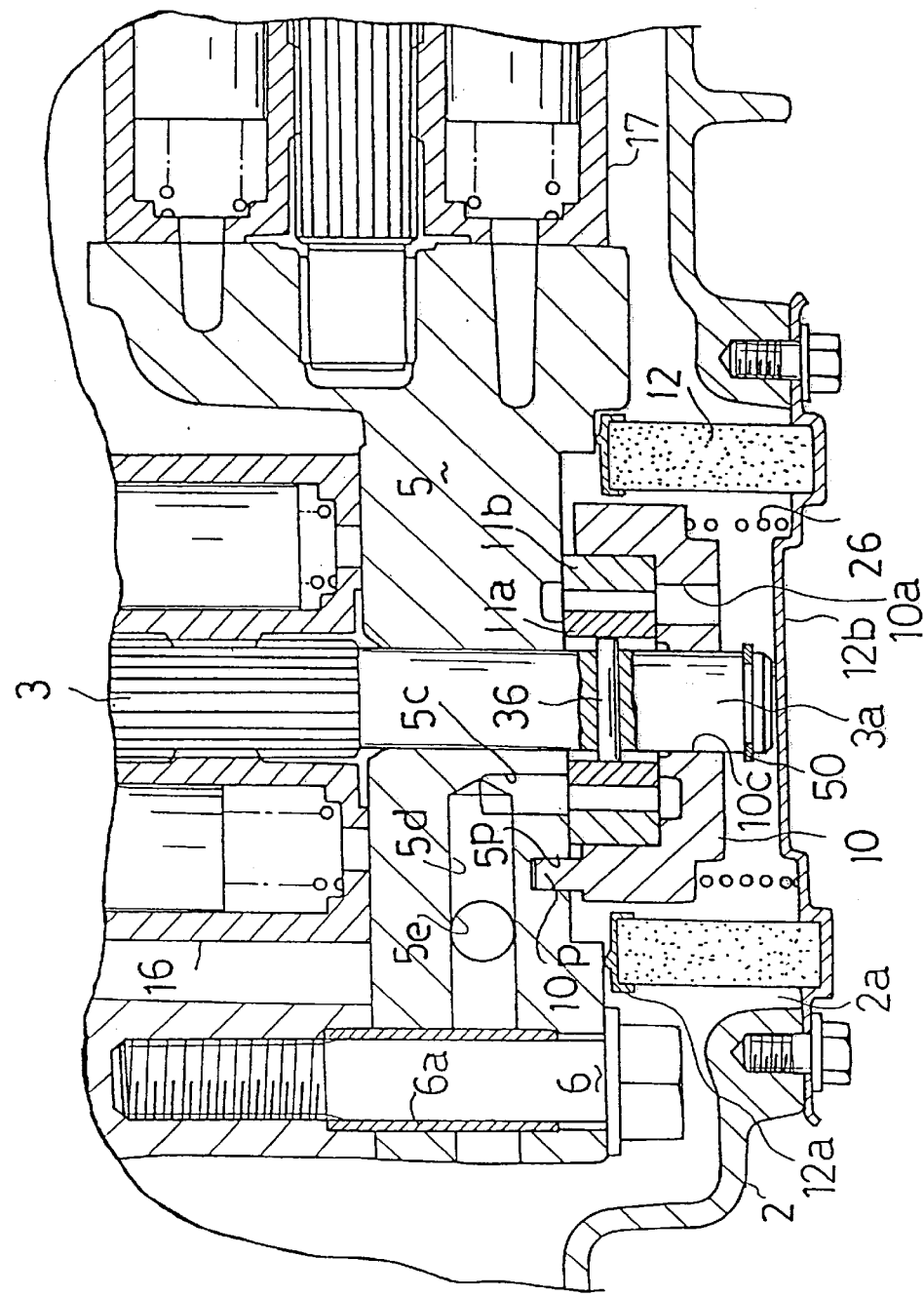
FIG. 12 is an enlarged cross-sectional view of the charge pump constructed to permit an oil filter to be removed from the housing without having to remove the charge pump.
Figure 13:
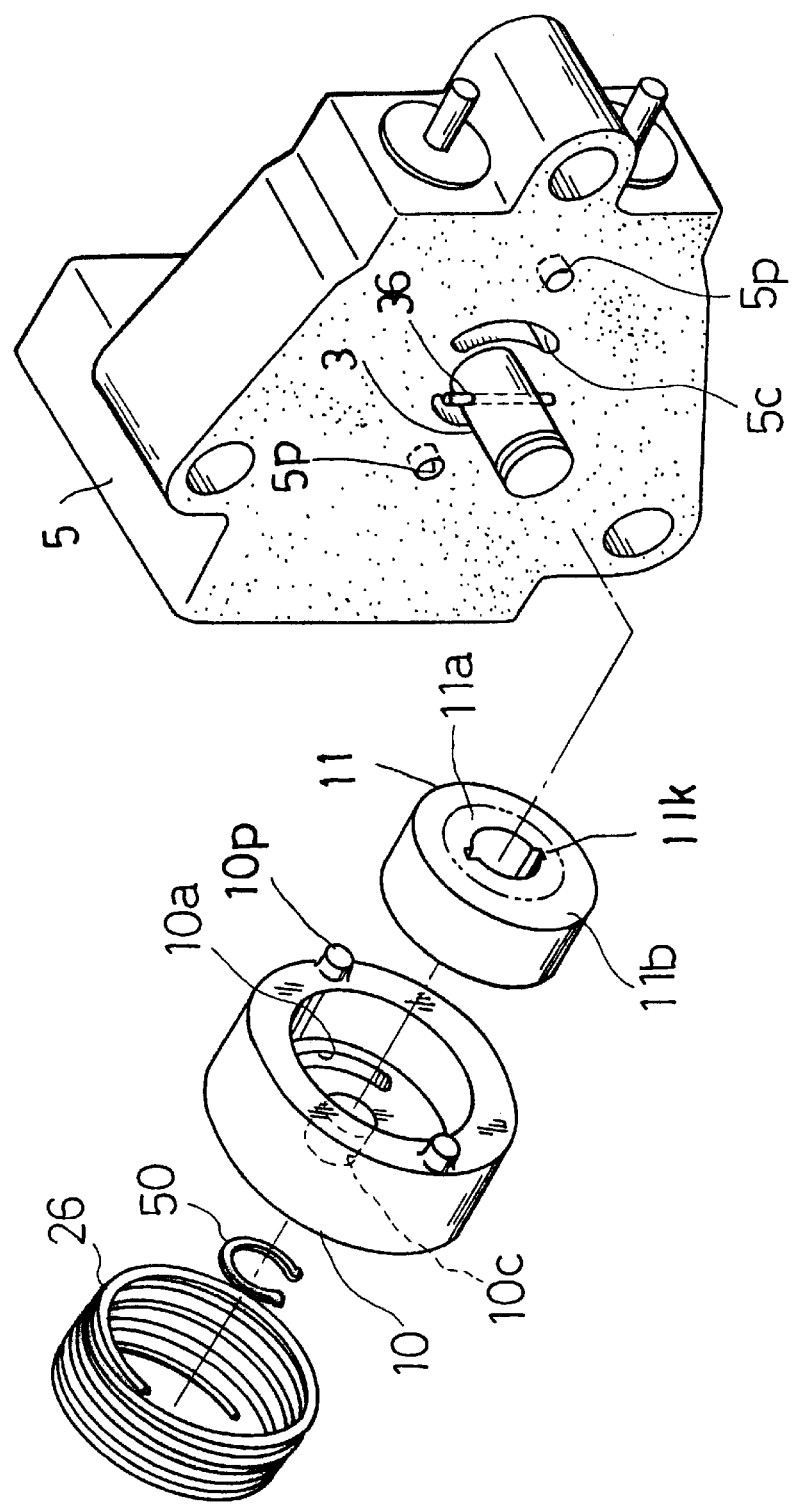
FIG. 13 is an exploded view of another embodiment of the charge pump in relation to the center section of the HST.

In the embodiment of the present invention shown in FIGS. 12 and 13, the same construction as in the sixth embodiment has been adopted to detain the rotation of pump casing 10 and to receive the radial force of pump casing 11. However, this embodiment is different in that the maintenance efficiency for the oil filter 12 has been improved. In particular, an opening 2*a* is formed in the lower surface of lower half housing 2. Opening 2*a* is larger than the external diameter of oil filter 12. A disc-like shaped sealing member 12*b*, which covers the lower surface of oil filter 12, and is larger than opening 2*a*, is detachably mounted to the outer bottom surface of lower half housing 2 by mounting bolts, thereby closing opening 2*a*. Hence, for maintenance and inspection of oil filter 12, sealing member 12*b* is removed from the housing to enable oil filter 12 to be simply removed therefrom. In addition, since the base of coil spring 26 abuts against the bottom surface of sealing member 12*b*, when oil filter 12 is removed from the housing, coil spring 26 is also removed therefrom which relieves the biasing force against pump casing 10. A snap ring 50 is mounted onto an end portion of the extension of input shaft 3. A gap allowing for the axially slidable movement of pump casing 10 is formed between snap ring 50 and the lower surface of pump casing 10. Therefore, even when pump casing 10 is no longer biased against center section 5, it drops only to the extent of the aforesaid gap and is received by snap ring 50. Thus, projection 10*p* remains fitted in engaging bore 5*p* and there is no concern that charge pump 11 will become accidentally dismantled from input shaft 3.

In each of the above-described embodiments of the present invention, pump casing 10, in which charge pump 11 is housed, never rotates around input shaft 3 even though it is not fixed by mounting bolts to center section 5. Pump casing 10 is simply mounted to one surface of center section 5 in a floating manner by being biased in close contact therewith through spring 26 while exclusively receiving the radial force created by input shaft 3. In the case where the pressure of the discharge oil from charge pump 11 becomes greater than the corresponding biasing force of spring 26, pump casing 10 together with charge pump 1 automatically move away from one surface of center section 5 toward spring 26. As a result, pressurized oil discharged in part from charge pump 11 may leak from between charge pump 11 and center section 5, whereby pump casing 10 and coil spring 26 function as a charge relief valve. Hence, there is no need for specially providing a charge relief valve within center section 5. This enables the HST to be more inexpensively produced.

Figure 16:
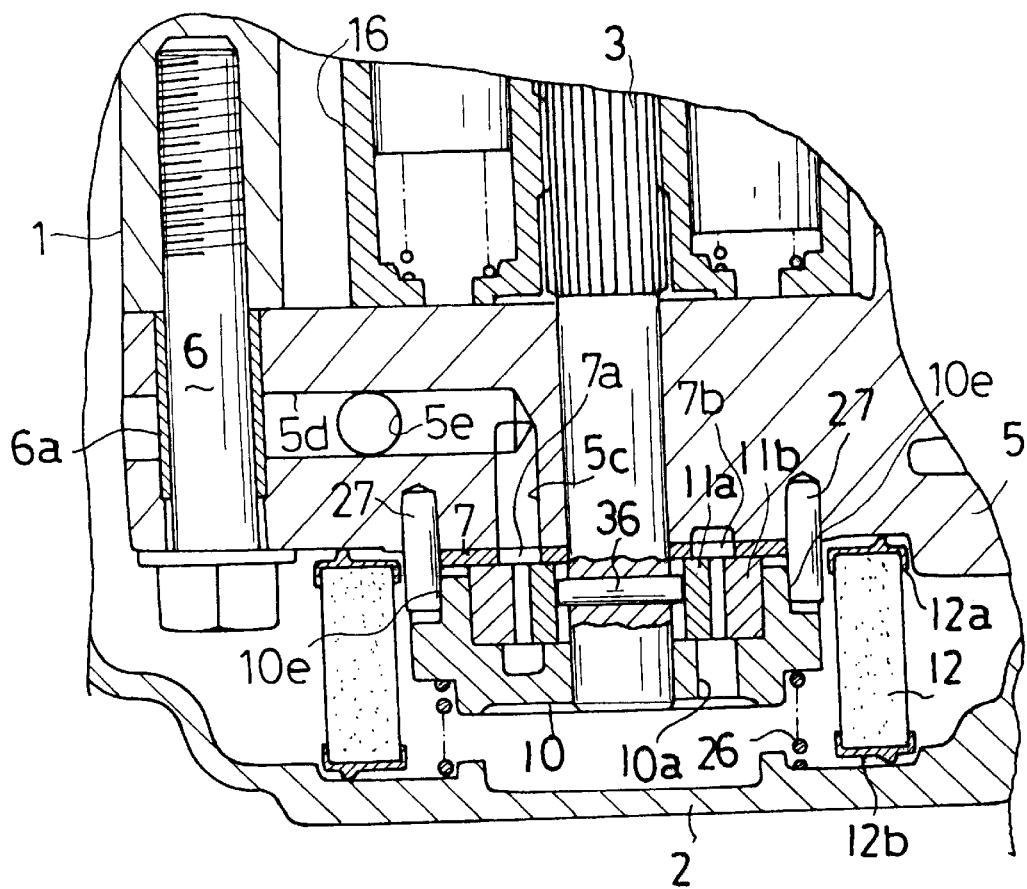
FIG. 16 is an enlarged cross-sectional view of the principal portions of the charge pump according to an embodiment of the present invention which disposes a plate between the center section and the charge pump.
Figure 17:
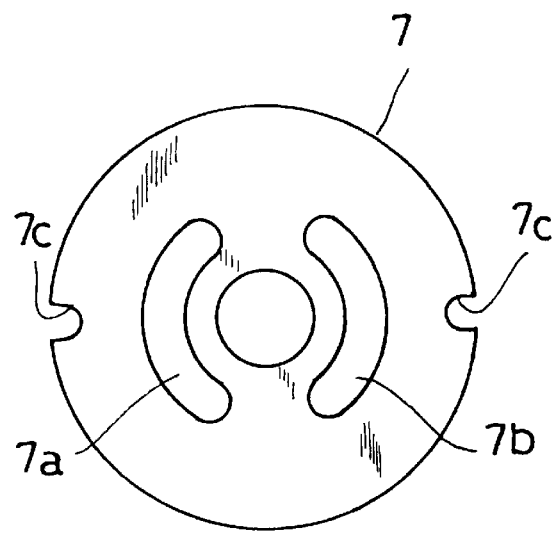
FIG. 17 is a plan view of the plate of FIG. 16.

An alternative embodiment of the present invention is shown in FIGS. 16 and 17. In this embodiment, a relatively thin plate 7 of metal material or sintered alloy is interposed between the horizontal lower surface of center section 5 and one end surface of charge pump 11. Plate 7 reduces the manufacturing cost and the rotating frictional resistance on center section 5 without increasing the processing accuracy of center section 5. As shown in FIG. 17, open kidney-shaped oil bores 7*a* and 7*b* are formed in plate 7 in positions corresponding to the position of the suction port and discharge port of charge pump 11, respectively. Oil bore 7*a* communicates with operating oil supply port 5*c* provided in center section 5. An opening for inserting input shaft 3 therein is provided in the center of plate 7. At the periphery of plate 7 are provided cutouts 7*c* in which guide pins 27 for detaining pump casing 10 are received. Plate 7*a* is kept in a fixed position between center section 5 and charge pump 11 so as to maintain communication of the discharge port of charge pump 11 with operating oil supply port 5*c*. A spring 26, the same as that described above with respect to the previous embodiments, is interposed between the lower surface of pump casing 10 and the inner bottom surface of lower half housing 2. One end surface of charge pump 11 presses against plate 7 to maintain an oil tight seal between oil bore 7*a* of plate 7, operating oil supply port 5*c* and the discharge port of charge pump 11. The remainder of the embodiment is similar to the first embodiment discussed above.

Figure 18:
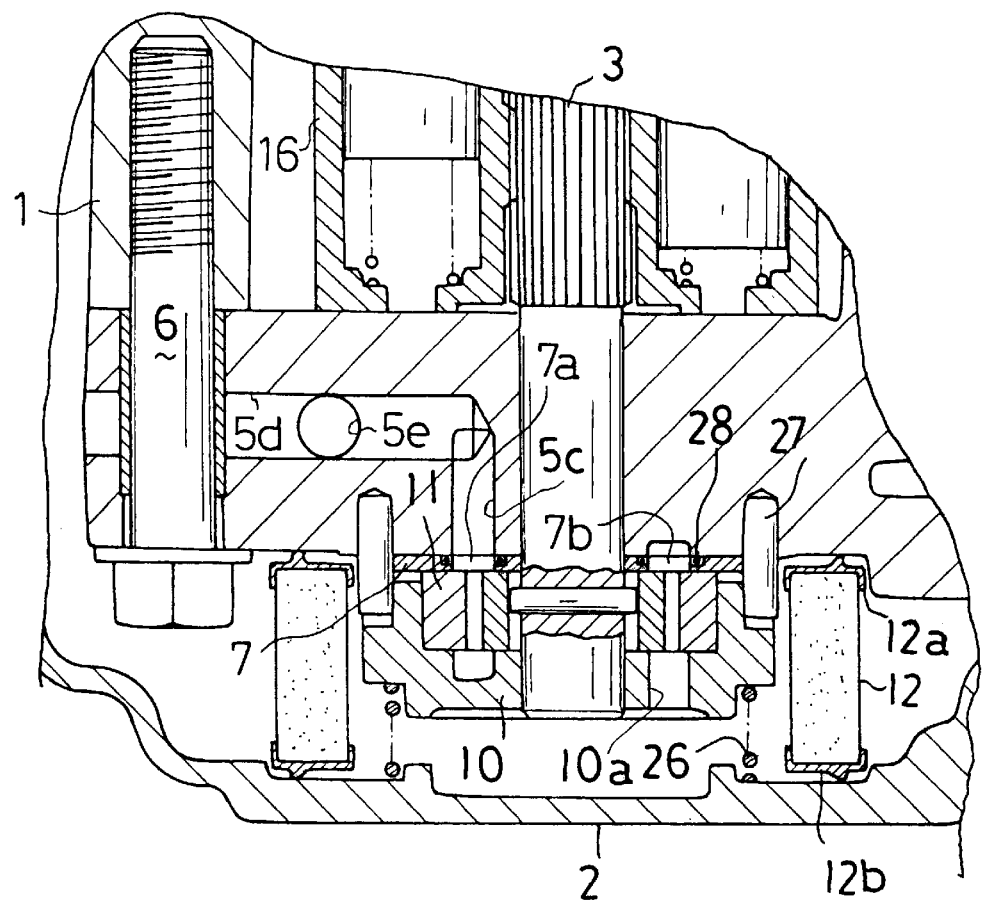
FIG. 18 is an enlarged cross-sectional view of the principal portions of a charge pump according to a modified embodiment of the present invention in which a plate on which an electric sealing member is mounted.
Figure 19:
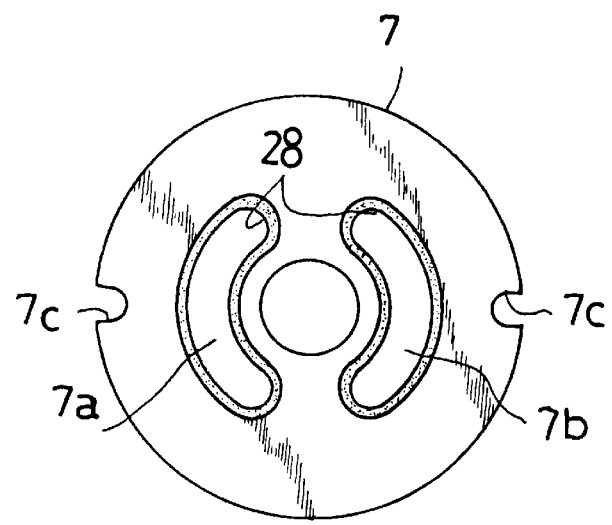
FIG. 19 is a plan view of the plate of FIG. 18.

FIGS. 18 and 19 show a modified embodiment of that shown in FIGS. 16 and 17, in which elastic sealing members 28, such as O-rings, are fitted onto the peripheral edges of oil bores 7*a* and 7*b* in plate 7. The elastic sealing members improve the close degree of contact between plate 7 and the horizontal lower surface of center section 5 to effectively guide the discharge oil from charge pump 11 into the closed fluid circuit.

Figure 20:
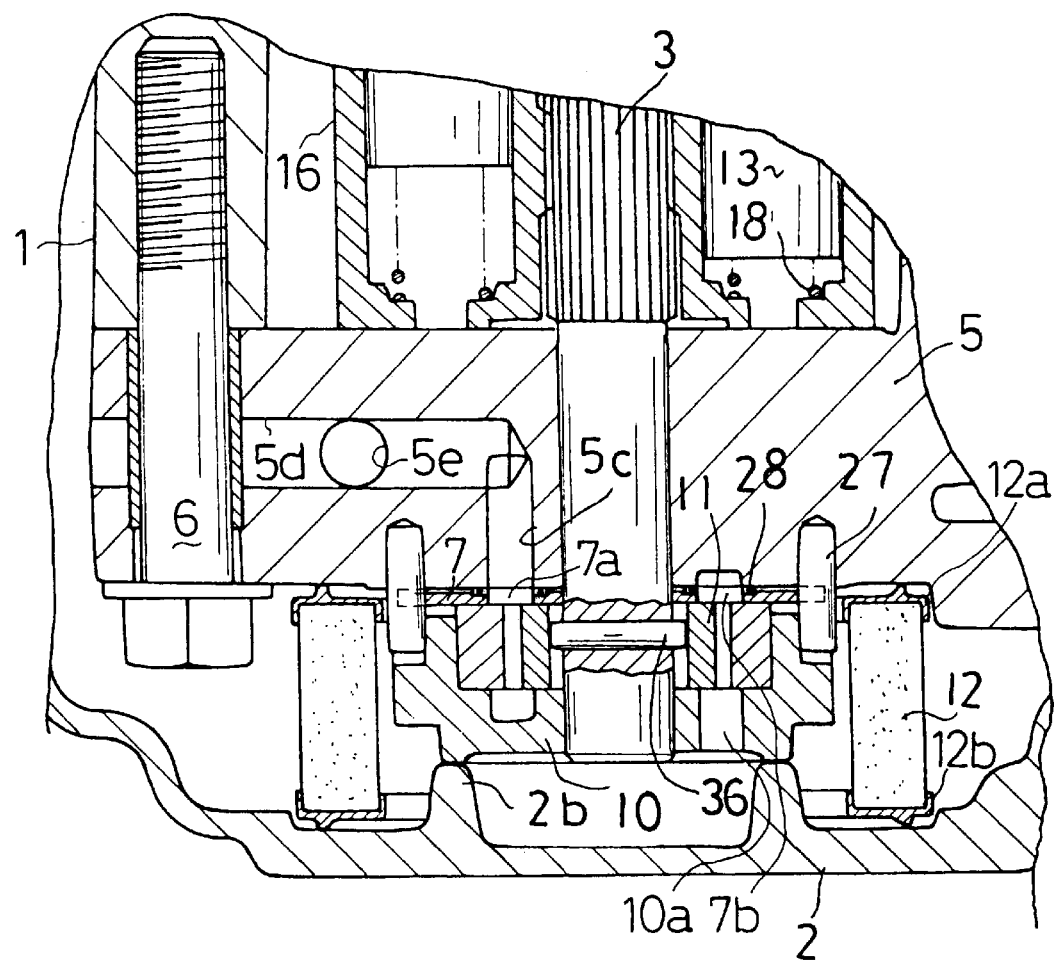
FIG. 20 is an enlarged cross-sectional view of the principal portions of the charge pump of a further modified embodiment of the present invention for holding the pump casing.
Figure 21:
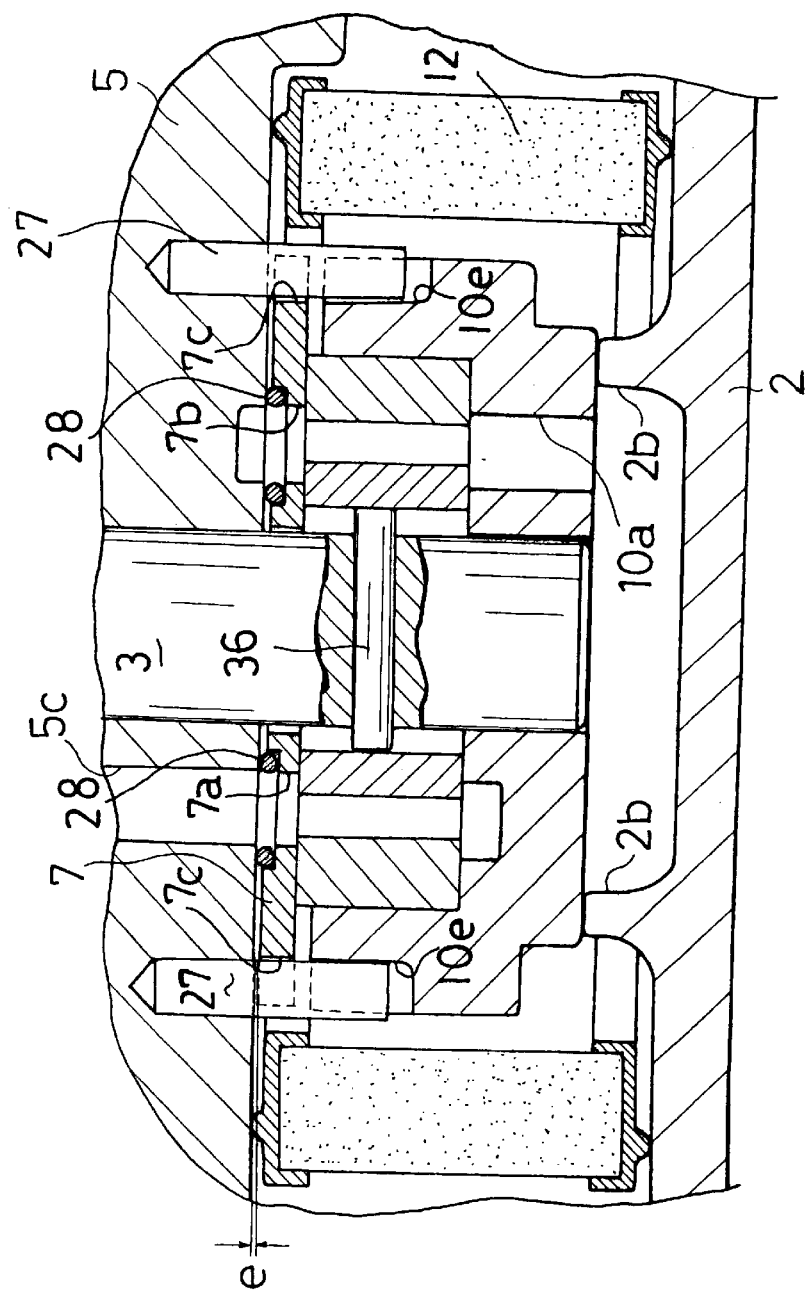
FIG. 21 is an enlarged cross-sectional view of the principal portions of the charge pump in FIG. 20.

The embodiment shown in FIGS. 20 and 21 is similar to that shown in FIGS. 18 and 19 however a projection 2*b* is provided on the inner bottom surface of lower half housing 2 and spring 26 of the previous embodiment is not used. Instead, the top of projection 2*b* abuts directly against the lower surface of pump casing 10 to support pump casing 10 in a floating manner. As is apparent in FIG. 21, elastic sealing members 28 are thicker than the depth of the groove into which elastic sealing members 28 are fitted. As a result, elastic sealing members 28 extend from the surface of plate 7 toward the horizontal lower surface of center section 5. Hence, when plate 7 is interposed between center section 5 and pump casing 10, a gap e is formed between the horizontal lower surface of center section 5 and plate 7. Discharge port 7*b* of plate 7 communicates with the discharge port of charge pump 11 and operating oil supply port 5*c* through elastic sealing members 28.

When the discharge oil from charge pump 11 is supplied to supply port 5*c* through discharge port 7*a*, pressure of the discharge oil acts on the inner periphery of elastic sealing members 28, so that when the pressure of the oil is greater than the corresponding elastic force of elastic sealing members 28, elastic sealing members 28 are deformed and oil leaks into the oil sump in the housing through the gap e.

In summary, a spring as used in the above-described embodiments is not used for biasing pump casing 10 in close contact with plate 7, rather, pump casing 10 is fixed to center section 5 and elastic sealing members 28 mounted onto plate 7 are utilized to provide an elastic force on pump casing 10. As a result, parts such as spring 26 can be omitted and pump casing 10 can function as a charge relief valve. Thus, a charge pump with a self-charging relief function can be produced at low cost.

Figure 22:
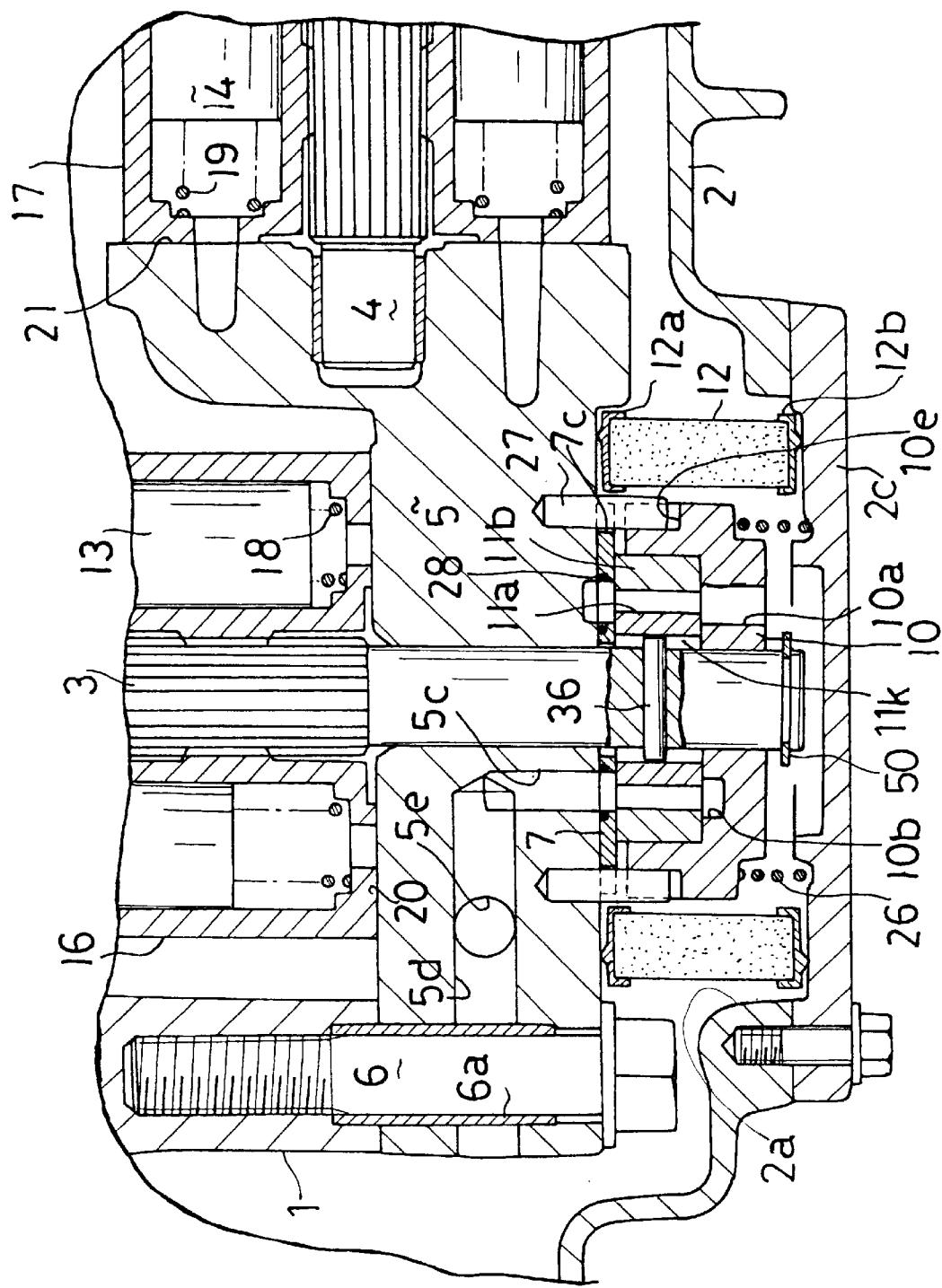
FIG. 22 is an enlarged cross-sectional view of the principal portions of the charge pump according to the further modified embodiment in which the oil filter can be easily removed.
Figure 23:
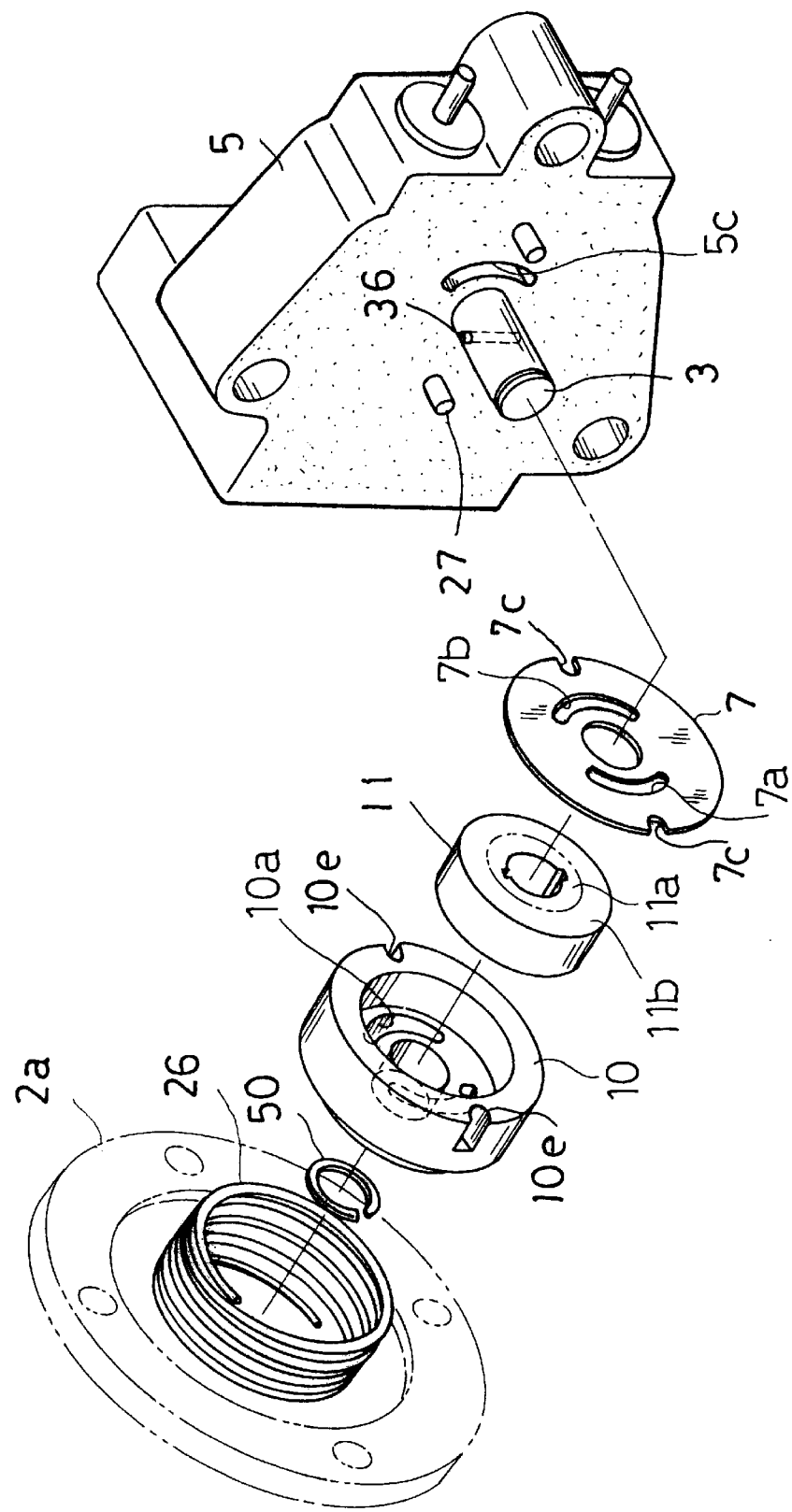
FIG. 23 is an exploded view of the charge pump in relation to the center section of FIG. 22.

The embodiment of the present invention shown in FIGS. 22 and 23 is similar to that described above with respect to FIGS. 20 and 21, however in this embodiment, an opening 2a is provided in the bottom wall of lower half housing 2 and is closed by a lid 2c, as shown in FIG. 12. When lid 2c is removed from lower half housing 2, oil filter 12 can be simply removed from the bottom of the same, the remainder construction of this is like that described above.

Figure 24:
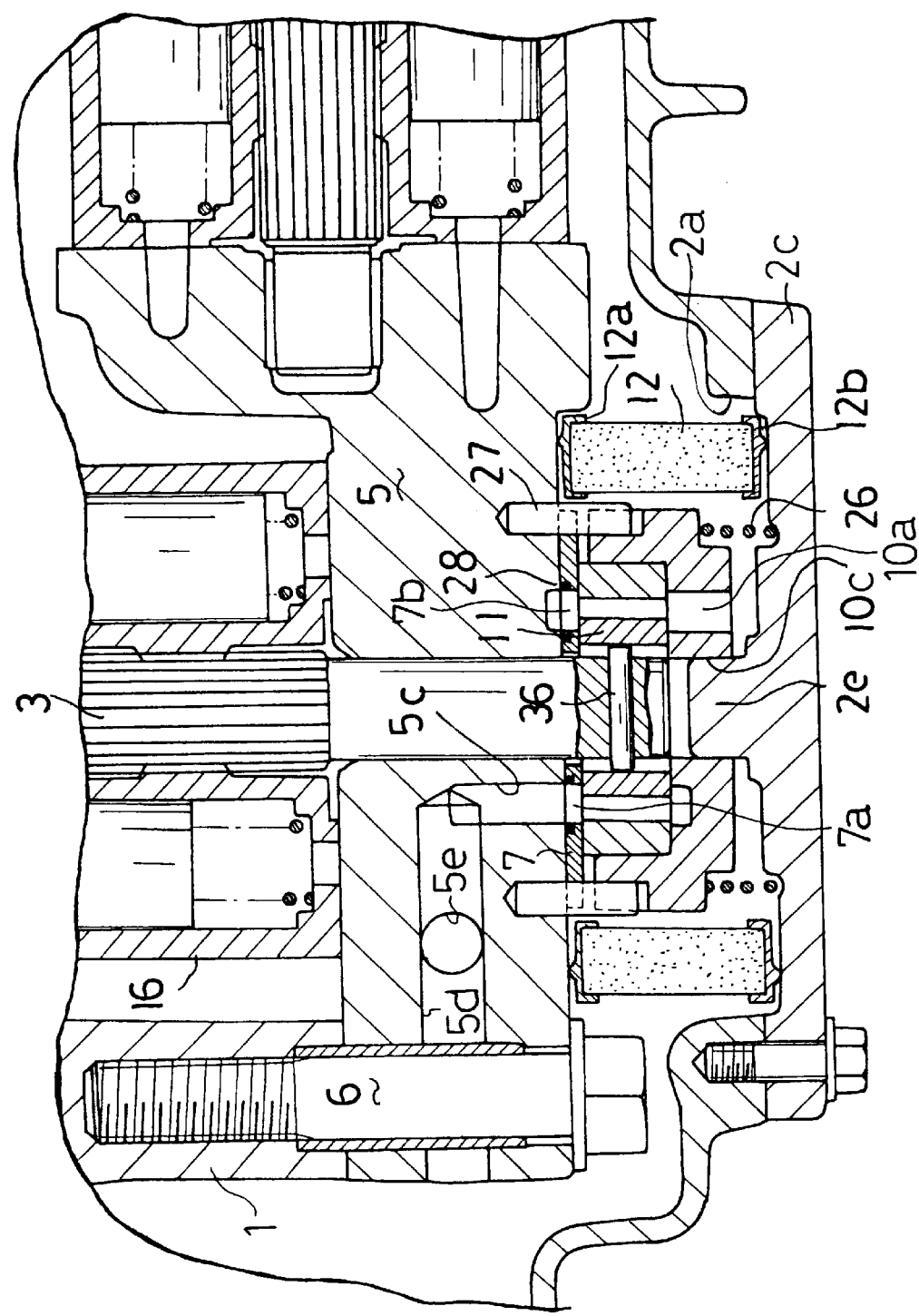
FIG. 24 is an enlarged cross-sectional view of the principal portions of the charge pump in a still further modified embodiment for receiving the radial force acting on the pump casing during the relief operation.

The embodiment of the present invention shown in FIG. 24 is similar to that shown in FIGS. 22 and 23 however, on the inner surface of lid 2c, which is mounted to the bottom wall of lower half housing 2, is integrally formed a guide pin 2e to be fitted into a pivotal support bore 10c provided along the lower surface of pump casing 10. Guide pin 2e is similar to projection 2k shown in FIG. 6, for example.

Figure 25:
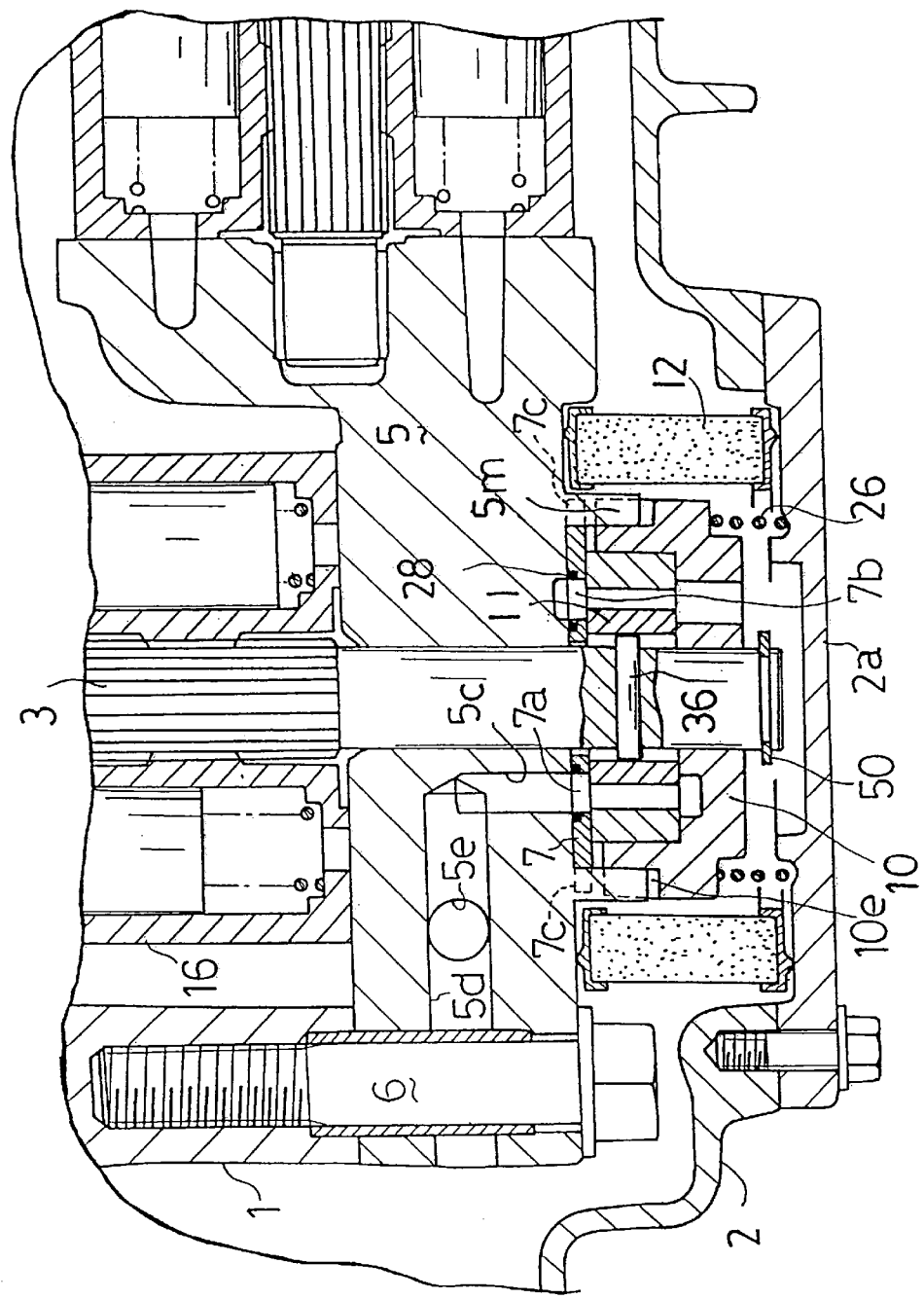
FIG. 25 is an enlarged cross-sectional view of the principal portions of the charge pump according to yet a further modified embodiment which has a modified detent for the plate.

The embodiment of the present invention shown in FIG. 25 is similar to that shown in FIG. 8, however, projections 5m provided on the horizontal lower surface of center section 5 engage with recesses 7c in plate 7 and recesses 10e in pump casing 10 to detain rotation of plate 7 and pump casing 10.

Figure 26:
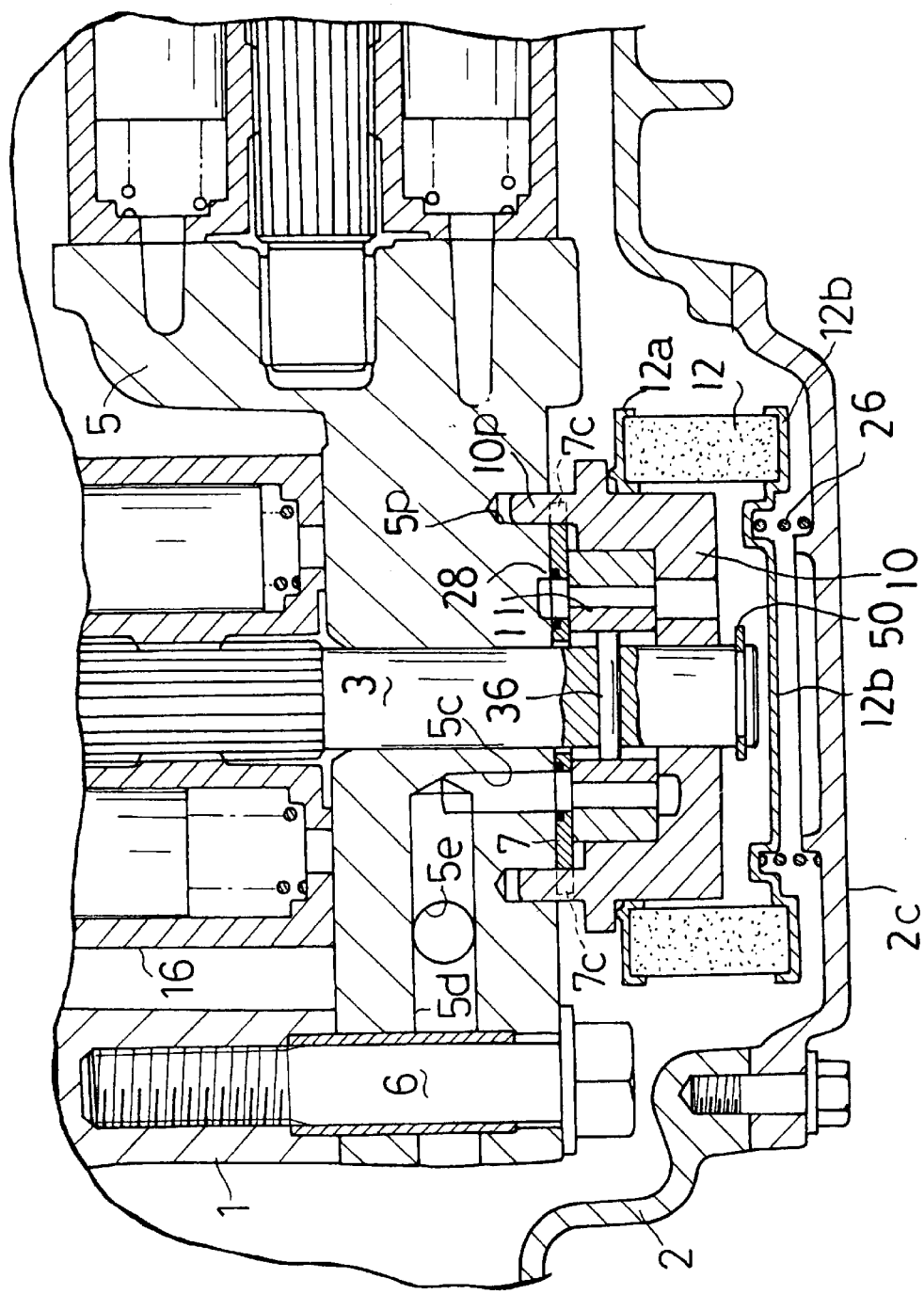
FIG. 26 is an enlarged cross-sectional view of the principal portions of the charge pump according to a further modified embodiment in which the detent for the plate is changed.

In the embodiment of the present invention shown in FIG. 26, spring 26 (as described above in previous embodiments) is interposed between a disc-like shaped sealing member 12b for oil filter 12 and the inner surface of lid 2c. Sealing member 12a is retained by a flange formed along the outer periphery of the pump casing 10. Pump casing 10 is biased against plate 7 by the biasing force of spring 26 through oil filter 12. As in the embodiment shown in FIG. 12, cylindrical projections 10p are formed on the upper surface of pump casing 10 and are inserted into fitting bores 5p provided on the horizontal lower surface of center section 5, thereby restraining rotation of pump casing 10. Projections 10p are retained in recesses 7c in plate 7 so as to restrain rotation of plate 7.

Figure 27:
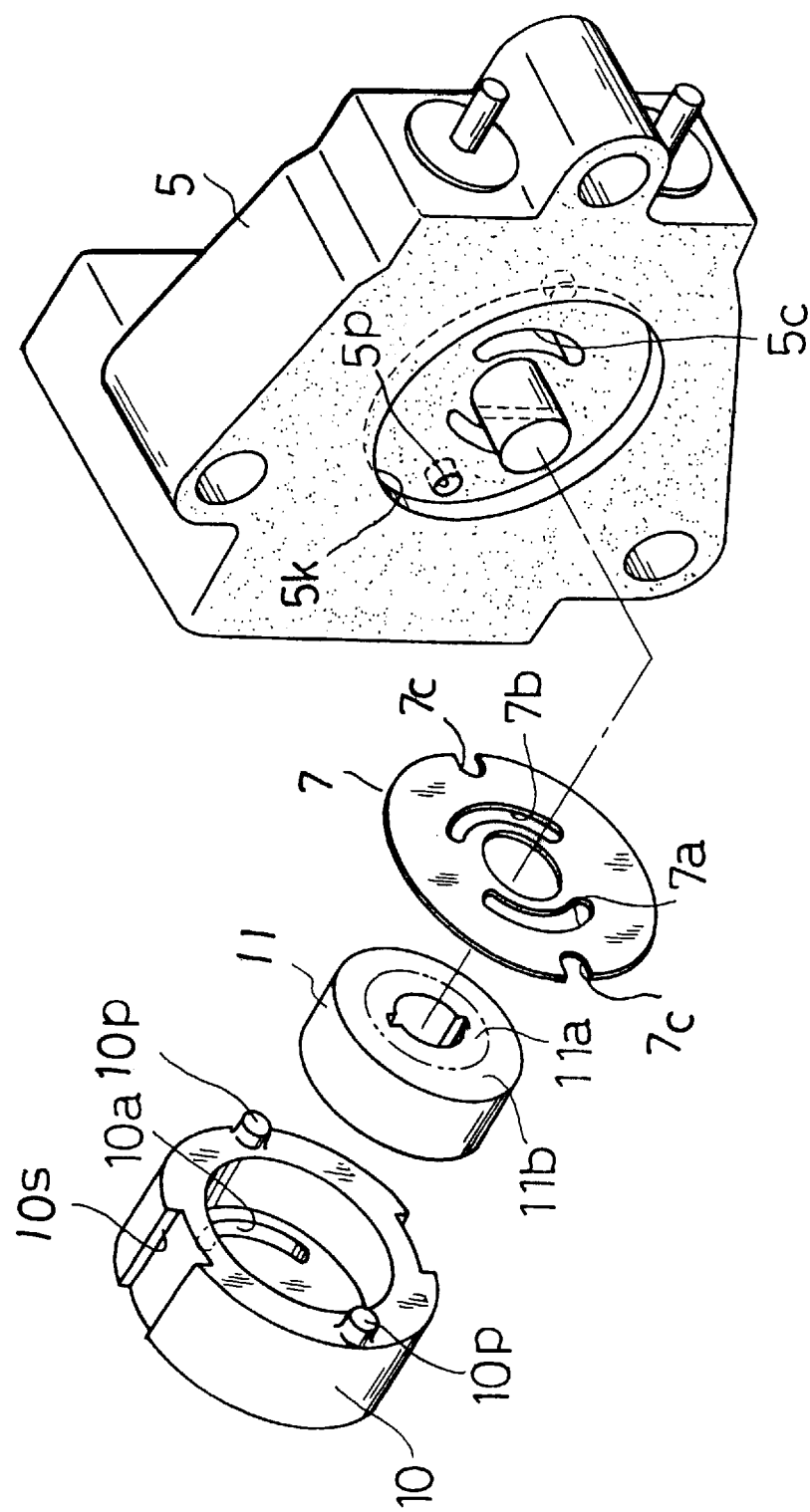
FIG. 27 is an exploded view of the charge pump according to a still further modified embodiment for receiving the radial force acting on the pump casing.

As seen in FIG. 27, a guide recess 5k large enough to receive the upper end portion of pump casing 10, and for receiving the radial force acting thereon, is formed on the horizontal lower surface of center section 5. Projections 10p are formed on the upper surface of pump casing 10. Engaging bore 5p, for receiving projections 10p, are also formed in recess 5k. Oil grooves 10s, similar to those shown in the embodiment of FIGS. 4 and 5, are provided along the outer periphery of pump casing 10. When oil pressure greater than the biasing force of spring 26 acts on pump casing 10, and when pump casing 10 moves axially in guide recess 5k, an oil passage is formed for discharging the pressurized oil from charge pump 11 between the peripheral surface of guide recess 5k and oil groove 10s.

In operation, when a moving vehicle provided with the HST having the charge pump of the present invention stops on a slope and the engine is turned off, the charge pump stops and does not supply operating oil into the closed fluid circuit. The hydraulic motor is provided with a rotational force for moving the vehicle down the slope due to the load corresponding to the weight of vehicle, whereby the hydraulic motor operates as a pump to circulate the operating oil in the closed fluid circuit. However, when the closed fluid circuit is filled with the operating oil, the hydraulic pump in the neutral state prevents the circulation of oil, thereby preventing rotation of the hydraulic motor.

Figure 14:
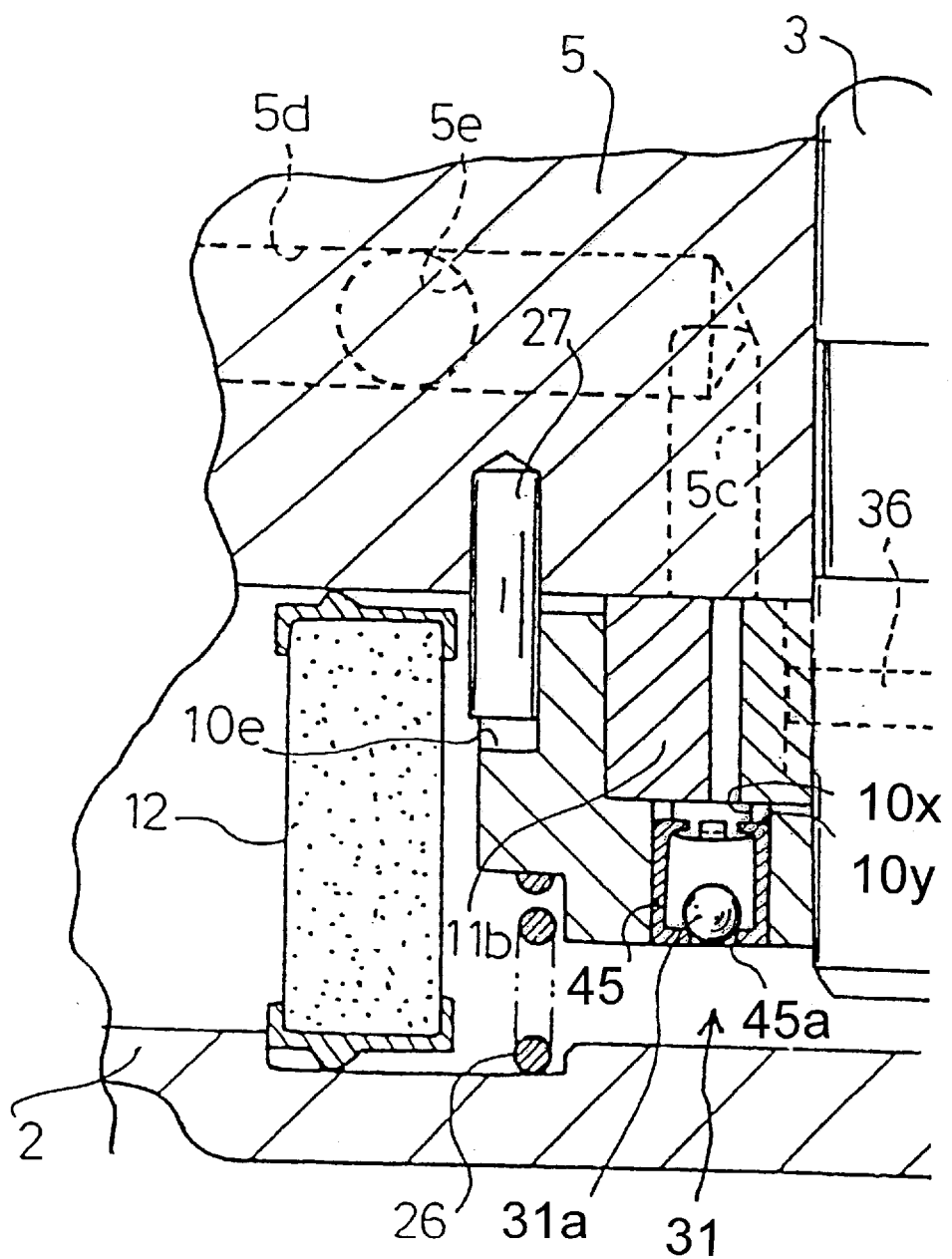
FIG. 14 is an enlarged cross-sectional view of the principal portions of a check valve housed in the pump casing.

However, the operating oil in the closed fluid circuit is subjected to pressure generated by the hydraulic motor, so that over time, operating oil leaks through a sliding portion of each piston contained in the cylinder block or the rotational sliding surface between the cylinder block and the center section. When negative pressure is generated in the closed fluid circuit, minute amounts of air in the oil expand and the hydraulic motor may freely rotate to cause the vehicle to runaway. In order to prevent this freewheeling of the vehicle, an auxiliary oil passage 10y, as shown in FIG. 14, for communicating between the discharge port of charge pump 11 and the oil sump in oil filter 12 is provided. In particular, a check valve 31 opens only when the closed fluid circuit is under negative pressure, is provided in auxiliary oil passage 10y. Check valve 31 enables the oil to be supplied into the closed fluid circuit through auxiliary oil passage 10y.

In particular, auxiliary oil passage 10y, which communicates with the discharge port of charge pump 11 is open at the lower surface of pump casing 10. A cylindrical member 45 containing therein a ball 31a is inserted from the bottom surface of recess 10x in charge pump casing 10 so as to constitute check valve 31. Cylindrical member 45 is formed by press processing. At the center of the bottom of cylindrical member 45 is provided an opening 45a through which the interior of oil filter 12 communicates with auxiliary oil passage 10y. The inside peripheral edge of opening 45 is used as a seat surface for ball 31a. At the peripheral edge of the upper end of opening 45a are radially provided a plurality of projections, one of which is bent inwardly of cylindrical member 45 so as to prevent ball 31a from escaping therefrom. Another one of the projections is bent outwardly and is retained to pump casing 10 to thereby prevent cylindrical member 45, which receives discharge pressure from charge pump 11, from separating from auxiliary oil passage 20y. A further one of the projections is also outwardly bent and is retained to the inner periphery of auxiliary passage 10y, thereby preventing cylindrical member 45 from moving toward the inner rotor 11a and outer rotor 11b of charge pump 11.

In the case where the engine stops and the vehicle is parked on a slope, when negative pressure is generated in the closed fluid circuit, even if charge pump 11 is not driven, ball 31a in check valve 31 is subjected to negative pressure so as to move ball 31a away from the seating surface of opening 45a in cylindrical member 45, so that clean operating oil in oil filter 12 opens check valves C at the low pressure side of the HST by way of the discharge port of charge pump 11, operating oil supply port 5c in center section 5 and oil passages 5d and 5e, so that some of the oil which is leaked is supplied back into the closed fluid circuit. Hence, the closed fluid circuit is always filled with the operating oil so as not to cause rotation of hydraulic motor M, whereby freewheeling of the vehicle is prevented.

Although the invention has been described with reference to several different embodiments, these embodiments are merely exemplary and are not limiting of the invention, which is defined solely by the appended claims.

What is claimed is:

1. A hydrostatic transmission comprising;
   a housing;
   an oil sump formed in said housing;
   a hydraulic pump disposed in said housing;
   a hydraulic motor disposed in said housing;
   a center section disposed in said housing on which said hydraulic pump and said hydraulic motor are mounted in fluid communication with each other;

an operating oil supply port formed on one surface of said center section for supplying operating oil circulating between said hydraulic pump and said hydraulic motor;

an input shaft rotatably supported by said housing and drivingly connected to said hydraulic pump, said input shaft having a portion projecting from said one surface of said center section;

a charge pump disposed on said one surface of said center section for pumping up operating oil from said oil sump and for discharging said operating oil into said center section through said operating oil supply port, said charge pump including, a pump casing detachably disposed on said one surface of said center section for housing said charge pump;

retaining means for retaining said pump casing from rotating around said input shaft so as to maintain communication between a discharge port of said charge pump and said operating oil supply port;

receiving means for receiving a radial force generated on said pump casing when said charge pump is driven, whereby said retaining means is not subjected to said radial force; and a flexible biasing means for pressing said charge pump toward said one surface of said center section.

2. A hydrostatic transmission according to claim 1, wherein said retaining means comprises:

a projection provided on one of said one surface of said center section and a surface of said pump casing which is opposite to said one surface; and a recess provided on the other of said one surface of said center section and said surface of said pump casing which is opposite to said one surface in engagement with said projection.

3. A hydrostatic transmission according to claim 1, further comprising:

an annular oil filter larger in the size than an external shape of said pump casing, said oil filter being disposed between a second surface of said center section and a surface of said housing opposite thereto and surrounding said retaining means, said receiving means, and said biasing means within said oil filter.

4. A hydrostatic transmission comprising;

a housing;

an oil sump formed in said housing;

a hydraulic pump disposed in said housing;

a hydraulic motor disposed in said housing;

a center section disposed in said housing on which said hydraulic pump and said hydraulic motor are disposed, said hydraulic pump and motor being fluidly connected with each other;

an operating oil supply port formed on one surface of said center section for supplying operating oil circulating between said hydraulic pump and said hydraulic motor;

an input shaft rotatably supported by said housing and drivingly connected with said hydraulic pump, said input shaft having a portion projecting from said one surface of said center section; and a charge pump disposed on said one surface of said center section so as to be driven by said portion of said input shaft in order to pump said operating oil from said oil sump and discharge said operating oil to said operating oil supply port, said charge pump including, a plate member disposed on said one surface of said center section, a pump casing detachably disposed on said plate member for housing said charge pump, said plate member interposed between said one surface of said center section and said pump casing and provided with an oil bore for guiding said operating oil discharged from said charge pump to said operating oil supply port, whereby said charge pump and said pump casing detach from said plate member at a predetermined discharge pressure, retaining means for retaining said pump casing from rotating around said input shaft to maintain said oil bore in position and for maintaining communication of a discharge port of said charge pump with said operating oil supply port, and receiving means for receiving a radial force generated on said pump casing when said charge pump is driven, whereby said retaining means is not subjected to said radial force.

5. A hydrostatic transmission according to claim 4, wherein said plate member further comprises:

a cutout provided at a periphery of said plate member for receiving said retaining means and maintaining said plate member in a fixed position so as to maintain fluid communication between said discharge port and said operating oil supply port.

6. A hydrostatic transmission according to claim 5, wherein said retaining means comprises:

projections provided on one of said one surface of said center section and a surface of said pump casing which are opposite to each other and are fitted into part of said plate member.

7. A hydrostatic transmission according to claim 6, further comprising;

biasing means for pressing said pump casing toward one surface of said center section; and recesses provided on one of said surface of said center section and a surface of said pump casing which are opposite to each other, wherein said projections engage with said recesses, thereby restraining said pump casing from rotating around said input shaft.

8. A hydrostatic transmission according to claim 7, wherein said biasing means comprises a spring provided between a surface of said pump casing and a surface of said housing which are opposite to each other.

9. A hydrostatic transmission according to claim 4, further comprising:

a sealing member provided on a peripheral edge of said oil bore of said plate member, said peripheral edge facing said one surface of said center section.

10. A hydrostatic transmission according to claim 9, further comprising biasing means for pressing said pump casing toward said one surface of said center section.

11. A hydrostatic transmission comprising;

a housing;

an oil sump formed in said housing;

a hydraulic pump disposed in said housing;

a hydraulic motor disposed in said housing;

a center section disposed in said housing on which said hydraulic pump and said hydraulic motor are mounted in fluid communication with each other;

an operating oil supply port formed on one surface of said center section for supplying operating oil circulating between said hydraulic pump and said hydraulic motor;

an input shaft rotatably supported by said housing and drivingly connected to said hydraulic pump, said input shaft having a portion projecting from said one surface of said center section;

a charge pump disposed on said one surface of said center section for pumping up operating oil from said oil sump and for discharging said operating oil into said center section through said operating oil supply port, said charge pump including,
a pump casing detachably disposed on said one surface of said center section;
retaining means for retaining said pump casing from rotating around said input shaft so as to maintain communication between a discharge port of said charge pump and said operating oil supply port;
receiving means, wherein a radial force generated on said pump casing when said charge pump is driven is directly received by said receiving means and by said input shaft, whereby said retaining means is not subjected to said radial force; and
biasing means for pressing said charge pump toward said one surface of said center section, wherein a biasing force of said biasing means defines a discharge pressure of said charge pump.

12. A hydrostatic transmission according to claim 11, wherein said receiving means comprises:
a bore provided in said pump casing into which an end of said portion of said input shaft is rotatably fitted.

13. A hydrostatic transmission comprising:
a housing;
an oil sump formed in said housing;
a hydraulic pump disposed in said housing;
a hydraulic motor disposed in said housing;
a center section disposed in said housing on which said hydraulic pump and said hydraulic motor are mounted in fluid communication with each other;
an operating oil supply port formed on one surface of said center section for supplying operating oil circulating between said hydraulic pump and said hydraulic motor;
an input shaft rotatably supported by said housing and drivingly connected to said hydraulic pump, said input shaft having a portion projecting from said one surface of said center section;
a charge pump disposed on said one surface of said center section for pumping up operating oil from said oil sump and for discharging said operating oil into said center section through said operating oil supply port, said charge pump including,
a pump casing detachably disposed on said one surface of said center section;
retaining means for retaining said pump casing from rotating around said input shaft so as to maintain communication between a discharge port of said charge pump and said operating oil supply port;
receiving means, wherein a radial force generated on said pump casing when said charge pump is driven is directly received by said receiving means and said center section; and
biasing means for pressing said charge pump toward said one surface of said center section, wherein a biasing force of said biasing means defines a discharge pressure of said charge pump.

14. A hydrostatic transmission according to claim 13, wherein said receiving means comprises:
a recess provided on said one surface of said center section shaped substantially similar to the external shape of said pump casing, whereby a portion of said pump casing is fitted into said recess.

15. A hydrostatic transmission comprising:
a housing;
an oil sump formed in said housing;
a hydraulic pump disposed in said housing;
a hydraulic motor disposed in said housing;
a center section disposed in said housing on which said hydraulic pump and said hydraulic motor are mounted in fluid communication with each other;
an operating oil supply port formed on one surface of said center section for supplying operating oil circulating between said hydraulic pump and said hydraulic motor;
an input shaft rotatably supported by said housing and drivingly connected to said hydraulic pump, said input shaft having a portion projecting from said one surface of said center section;
a charge pump disposed on said one surface of said center section for pumping up operating oil from said oil sump and for discharging said operating oil into said center section through said operating oil supply port, said charge pump including,
a pump casing detachably disposed on said one surface of said center section;
retaining means for retaining said pump casing from rotating around said input shaft so as to maintain communication between a discharge port of said charge pump and said operating oil supply port;
receiving means, wherein a radial force generated on said pump casing when said charge pump is driven is directly received by said receiving means and said housing, whereby said retaining means is not subjected to said radial force; and
biasing means for pressing said charge pump toward said one surface of said center section, wherein a biasing force of said biasing means defines a discharge pressure of said charge pump.

16. A hydrostatic transmission according to claim 15, wherein said receiving means comprises:
a projection provided on one of a surface of said pump casing and a surface of said housing which are opposite to each other; and
a recess provided on the other of said surfaces, said projection being in engagement with said recess.

17. A hydrostatic transmission comprising:
a housing;
an oil sump formed in said housing;
a hydraulic pump disposed in said housing;
a hydraulic motor disposed in said housing;
a center section disposed in said housing on which said hydraulic pump and said hydraulic motor are mounted in fluid communication with each other;
an operating oil supply port formed on one surface of said center section for supplying operating oil circulating between said hydraulic pump and said hydraulic motor;
an input shaft rotatably supported by said housing and drivingly connected to said hydraulic pump, said input shaft having a portion projecting from said one surface of said center section;
a charge pump disposed on said one surface of said center section for pumping up operating oil from said oil sump and for discharging said operating oil into said center section through said operating oil supply port, said charge pump including,
a pump casing detachably disposed on said one surface of said center section for housing said charge pump; and
a coil spring interposed between said pump casing and said housing for pressing said charge pump toward said one surface of said center section.

18. A hydrostatic transmission comprising:
a housing;
an oil sump formed in said housing;
a hydraulic pump disposed in said housing;
a hydraulic motor disposed in said housing;
a center section disposed in said housing on which said hydraulic pump and said hydraulic motor are mounted in fluid communication with each other;
an operating oil supply port formed on one surface of said center section for supplying operating oil circulating between said hydraulic pump and said hydraulic motor;
an input shaft rotatably supported by said housing and drivingly connected to said hydraulic pump, said input shaft having a portion projecting from said one surface of said center section;
a charge pump disposed on said one surface of said center section for pumping up operating oil from said oil sump and for discharging said operating oil into said center section through said operating oil supply port, said charge pump including,
 a pump casing detachably disposed on said one surface of said center section for housing said charge pump; and
 biasing means for pressing said charge pump toward said one surface of said center section;
 wherein said biasing means is constructed so that two surfaces of said pump casing and housing which are opposite to each other, abut against each other.

19. A hydrostatic transmission according to claim 18 further comprising:
a plate member interposed between said one surface of said center section and said pump casing and provided with an oil bore for guiding said operating oil discharged from said charge pump to said operating oil supply port.

20. A hydrostatic transmission according to claim 18, wherein said plate member further comprises:
a cutout provided at a periphery of said plate member for receiving said retaining means and maintaining said plate member in a fixed position so as to maintain fluid communication between said discharge port and said operating oil supply port.

21. A hydrostatic transmission comprising:
a housing;
an oil sump formed in said housing;
a hydraulic pump disposed in said housing;
a hydraulic motor disposed in said housing;
a center section disposed in said housing on which said hydraulic pump and said hydraulic motor are mounted in fluid communication with each other;
an operating oil supply port formed on one surface of said center section for supplying operating oil circulating between said hydraulic pump and said hydraulic motor;
an input shaft rotatably supported by said housing and drivingly connected to said hydraulic pump, said input shaft having a portion projecting from said one surface of said center section;
a charge pump disposed on said one surface of said center section for pumping up operating oil from said oil sump and for discharging said operating oil into said center section through said operating oil supply port, said charge pump including,
 a pump casing detachably disposed on said one surface of said center section for housing said charge pump, and
 biasing means for pressing said charge pump toward said one surface of said center section;
an oil filter disposed in said oil sump;
an opening provided on a portion of said housing opposite to said one surface of said center section, said opening being larger in size than said oil filter, and
a lid detachably mounted onto an outer wall of said housing for closing said opening, said oil filter disposed on an inner surface of said lid and in fluid communication with a suction port of said charge pump.

22. A hydrostatic transmission according to claim 21, wherein said oil filter is disposed between said one surface of said center section and said inner surface of said lid, and surrounding said pump casing and said biasing means.

23. A hydrostatic transmission according to claim 21, further comprising:
receiving means for receiving a radial force generated when said charge pump is driven, said receiving means including a bore provided in said pump casing into which an end of said portion of said input shaft is rotatably fitted, and a snap ring provided on said portion of said input shaft preventing separation of said pump casing from said input shaft.

24. A hydrostatic transmission comprising:
a housing;
an oil sump formed in said housing;
a hydraulic pump disposed in said housing;
a hydraulic motor disposed in said housing;
a center section disposed in said housing on which hydraulic pump and said hydraulic motor are mounted in fluid communication with each other;
an operating oil supply port formed on one surface of said center section for supplying operating oil circulating between said hydraulic pump and said hydraulic motor;
an input shaft rotatably supported by said housing and drivingly connected to said hydraulic pump, said input shaft having a portion projecting from said one surface of said center section;
a charge pump disposed on said one surface of said center section for pumping up operating oil from said oil sump and for discharging said operating oil into said center section through said operating oil supply port, said charge pump including,
 a pump casing detachably disposed on said one surface of said center section for housing said charge pump, and
 biasing means for pressing said charge pump toward said one surface of said center section; and
a flange provided on an outer periphery of said pump casing;
an oil filter provided with a sealing member abutting against said flange, said oil filter in fluid communication with a suction port of said charge pump;
an opening provided at a portion of said housing opposite to said oil filter, said opening being larger in size than said oil filter;
a lid detachably mounted to an outer wall of said housing for closing said opening; and
a spring disposed between said oil filter and said lid, wherein a biasing force is generated by said spring and is applied onto said pump casing through said oil filter and said flange.

* * * * *